(12) United States Patent
Tsutsuji

(10) Patent No.: US 9,334,817 B2
(45) Date of Patent: May 10, 2016

(54) SUPERCHARGING SYSTEM AND DIAGNOSTIC METHOD FOR SUPERCHARGING SYSTEM

(71) Applicant: Toyota Jidosha Kabushiki Kaisha, Toyota-shi (JP)

(72) Inventor: Shunichi Tsutsuji, Okazaki (JP)

(73) Assignee: TOYOTA JIDOSHA KABUASHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/793,062

(22) Filed: Jul. 7, 2015

(65) Prior Publication Data
US 2016/0010572 A1  Jan. 14, 2016

(30) Foreign Application Priority Data
Jul. 11, 2014  (JP) .................................. 2014-143468

(51) Int. Cl.
*G01M 15/04* (2006.01)
*F02D 41/00* (2006.01)

(52) U.S. Cl.
CPC .................................. *F02D 41/0007* (2013.01)

(58) Field of Classification Search
CPC .............................. G01L 23/24; G01M 15/04
USPC ............................. 73/114.37, 114.76, 114.77
See application file for complete search history.

(56) References Cited

U.S. PATENT DOCUMENTS

| 4,651,561 A * | 3/1987 | Ueno et al. .................. 73/114.37 |
| 5,546,795 A * | 8/1996 | Yamagishi .................. 73/114.33 |
| 7,353,102 B2 * | 4/2008 | Narita et al. .................. 701/102 |
| 2011/0154892 A1 * | 6/2011 | Ibuki et al. .................. 73/114.79 |

FOREIGN PATENT DOCUMENTS

JP          09-4507          1/1997

* cited by examiner

*Primary Examiner* — Eric S McCall
(74) *Attorney, Agent, or Firm* — Oblon, McClelland, Maier & Neustadt, L.L.P

(57) ABSTRACT

A supercharging system includes a waste gate valve (35) mounted in a bypass passage (34) that bypasses a turbine (31) and through which exhaust gas flows. An electronic control unit (39) that diagnoses abnormality of the supercharging system makes a first abnormality determination and a second abnormality determination, each of which is based on an integrated value of an intake air amount and an increased amount of supercharging pressure in each of a first determination period from initiation to termination of an increase in the supercharging pressure and a second determination period from initiation to termination of an increase in the intake air amount.

10 Claims, 12 Drawing Sheets

SUPERCHARGING SYSTEM AND DIAGNOSTIC METHOD FOR SUPERCHARGING SYSTEM

INCORPORATION BY REFERENCE

The disclosure of Japanese Patent Application No. 2014-143468 filed on Jul. 11, 2014 including the specification, drawings and abstract is incorporated herein by reference in its entirety.

BACKGROUND OF THE INVENTION

1. Field of the Invention

The invention relates to a supercharging system and a diagnostic method for a supercharging system.

2. Description of Related Art

As supercharging systems applied to internal combustion engines, supercharging systems such as a turbocharger that uses exhaust energy for supercharging are available. This type of supercharging system includes a compressor and a turbine. Said compressor is mounted in an intake passage of the internal combustion engine, pressurizes intake air flowing through the intake passage, and discharges the pressurized intake air into a combustion chamber of the internal combustion engine. Said turbine is mounted in an exhaust passage of the internal combustion engine and operated by a flow force of exhaust gas flowing through the exhaust passage to drive the compressor. Furthermore, this type of supercharging system that includes a bypass passage and a waste gate valve is also available. In order to actively control a supercharging operation of the supercharging system, said bypass passage is used for the exhaust gas to bypass the turbine and flow therethrough. The waste gate valve blocks a flow of the exhaust gas flowing through the bypass passage when the waste gate valve is fully closed, and permits the flow of the exhaust gas when the waste gate valve is opened.

As a technique for diagnosing presence or absence of abnormality, such as fixing of the waste gate valve, a technique described in Japanese Patent Application Publication No. 09-004507 (JP 09-004507 A) has conventionally been known. In JP 09-004507 A, supercharging pressure during supercharging and supercharging pressure during non-supercharging are compared, and presence of fixing is determined when a difference in the supercharging pressure is smaller than a value predicted in a normal time. In this way, the presence or absence of fixing of the waste gate valve is diagnosed.

In addition, as the supercharging system, a supercharger that is operated by power of the internal combustion engine for supercharging is also available. Then, this type of supercharging system that includes a relief valve in a portion of the intake passage on a downstream side of the supercharger, opens the relief valve when the supercharging pressure becomes excessively high, and lets some of the intake air flow out thereof to lower the supercharging pressure.

By the way, one type of abnormality of the waste gate valve is called slightly opened fixing, that is, the valve is fixed at a position slightly opened from a fully closed position and thus is not fully closed. Also during such slightly opened fixing, the supercharging pressure is increased to some extent. Thus, with the above conventional diagnostic method, which is based on the supercharging pressure, it may be impossible to detect the abnormality with sufficient accuracy.

In addition, there is a case where the relief valve of the above supercharger is slightly opened and fixed. Also during such slightly opened fixing of the relief valve, the supercharging pressure is increased to some extent. Thus, with the above conventional diagnostic method, which is based on the supercharging pressure, it is difficult to secure the diagnostic accuracy.

SUMMARY OF THE INVENTION

In view of circumstances as described above, the invention provides a supercharging system and a diagnostic method for a supercharging system, both of which allow favorable diagnoses of abnormality of the supercharging system, including abnormality with a relatively small change appeared in supercharging pressure.

According to one aspect of the invention, a supercharging system that includes following components is provided. The supercharging system includes a supercharger, a supercharging pressure lowering mechanism, and an electronic control unit. The supercharger is configured to supercharge an internal combustion engine. The supercharging pressure lowering mechanism is configured to lower supercharging pressure by the supercharger. The electronic control unit is configured to:

(i) execute a first abnormality determination, the first abnormality determination having a period from initiation of an increase in the supercharging pressure that occurs after initiation of an increase in an intake air amount to termination of the increase in the supercharging pressure as a first determination period, (ii) determine presence or absence of abnormality of the supercharging system based on a first air amount integrated value of the intake air amount and a first peak supercharging pressure in the first determination period when an increased amount of the supercharging pressure in the first determination period is set as the first peak supercharging pressure, (iii) execute a second abnormality determination, the second abnormality determination having a period from initiation of an increase in the intake air amount to termination of an increase in the supercharging pressure as a second determination period, and (iv) determine presence or absence of the abnormality of the supercharging system based on a second air amount integrated value of the intake air amount and a second peak supercharging pressure in the second determination period when an increased amount of the supercharging pressure in the second determination period is set as the second peak supercharging pressure.

The first air amount and the second air amount integrated values of the intake air amount and the increased amounts of the supercharging pressures are respectively correlated with each other. Thus, regarding abnormality, such as slightly opened fixing of a waste gate valve, that leads to relatively little decrease in the supercharging pressure, an appropriate diagnosis can be made by determining the presence or absence of the abnormality in the first abnormality determination that is based on the first air amount integrated value of the intake air amount and the first peak supercharging pressure in the first determination period. Meanwhile, regarding abnormality, such as fully opened fixing of the waste gate valve, that leads to significant decrease in the supercharging pressure, a diagnosis may not be made with sufficient accuracy by the first abnormality determination. However, such abnormality can appropriately be diagnosed by the second abnormality determination that is based on the second air amount integrated value of the intake air amount and the second peak supercharging pressure in the second determination period. Thus, according to the supercharging system as described above, the abnormality of the supercharging system, which includes the abnormality with a relatively small change being appeared in the supercharging pressure, can further appropriately be diagnosed.

In the supercharging system, in the first abnormality determination and the second abnormality determination, the electronic control unit may be configured to (i) set a determination value to be a higher value when the first and the second peak supercharging pressures are high in comparison with a case where the first and the second peak supercharging pressures are low, and (ii) determine that there is abnormality in the supercharging system when the first and the second air amount integrated values of the intake air amounts are higher than the determination values respectively. In addition, in the supercharging system, in the first abnormality determination and the second abnormality determination, the electronic control unit may be configured to (iii) set the determination value to be a higher value when the first and the second air amount integrated values of the intake air amounts are high in comparison with a case where the first and the second air amount integrated values of the intake air amounts are low and (iv) determine that there is abnormality in the supercharging system when the first and the second peak supercharging pressures are lower than the determination values respectively.

It should be noted that the first and the second peak supercharging pressures show higher correlation with the first and the second air amount integrated values of increased amounts of the intake air amounts than with the first and the second air amount integrated values of the intake air amounts themselves respectively. Thus, in each of the first abnormality determination and the second abnormality determination, the first and the second air amount integrated values of the intake air amounts may be computed respectively as a value that is obtained by integrating the increased amount of the intake air amount from the initiation of each of the first determination period and the second determination period to make the determinations. According to such a supercharging system, the diagnoses can be made with further improved accuracy.

In the supercharging system, the supercharger may be a supercharger including an exhaust turbine. The supercharger may be configured to supercharge by driving a compressor that is mounted in an intake passage of the internal combustion engine by the exhaust turbine that is mounted in an exhaust passage of the internal combustion engine and operated by a flow force of exhaust gas flowing in the exhaust passage. Then, the supercharging pressure lowering mechanism may be the waste gate valve. The waste gate valve may be configured to be mounted in a bypass passage that is used for the exhaust gas to bypass the exhaust turbine and flow through the bypass passage, block the exhaust gas from flowing through the bypass passage when the waste gate valve is fully closed, and permit a flow of the exhaust gas to flow through the bypass passage when the waste gate valve is opened. In such a supercharging system, the electronic control unit can appropriately determine presence or absence of the slightly opened fixing of the waste gate valve by the first abnormality determination and presence or absence of the fully opened fixing of the waste gate valve by the second abnormality determination.

In the supercharging system, the supercharger may be a mechanical supercharger. The mechanical supercharger may be a supercharger configured tp supercharge by driving the compressor that is mounted in the intake passage of the internal combustion engine by power of the internal combustion engine. In addition, the supercharging pressure lowering mechanism may be a relief valve. The relief valve is provided in a portion of the intake passage of the internal combustion engine that is on a downstream side of the compressor. The relief valve may be configured to (i) discharge some of the intake air flowing through the relief valve to the outside when the relief valve is opened and (ii) block discharging from the relief valve when the relief valve is fully closed. In the supercharging system as described above, the electronic control unit can appropriately determine the presence or absence of the slightly opened fixing of the relief valve by the first abnormality determination and the presence or absence of the fully opened fixing of the relief valve by the second abnormality determination.

According to another aspect of the invention, a diagnostic method for a supercharging system as will be described below is provided. Here, the supercharging system includes a supercharger configured to supercharge an internal combustion engine and a supercharging pressure lowering mechanism configured to lower supercharging pressure. The diagnostic method includes:

(i) setting a period from initiation of an increase in the supercharging pressure that occurs after initiation of an increase in an intake air amount to termination of the increase as a first determination period;

(ii) setting a period from the increase in the intake amount to the termination of the increase in the supercharging pressure as a second determination period; and (iii) executing a first abnormality determination and a second abnormality determination as determinations of presence or absence of abnormality of the supercharging system, the first abnormality determination being a determination that is based on a relationship between a first air amount integrated value of the intake air amount and a first peak supercharging pressure in the first determination period when an increased amount of the supercharging pressure in the first determination period is set as the first peak supercharging pressure, and the second abnormality determination is a determination that is based on a relationship between a second air amount integrated value of the intake air amount and a second peak supercharging pressure in the second determination period when an increased amount of the supercharging pressure in the second determination period is set as the second peak supercharging pressure.

According to the diagnostic method, abnormality, such as slightly opened fixing of the waste gate valve, that leads to relatively little decrease in the supercharging pressure can appropriately be diagnosed by the first abnormality determination. In addition, abnormality, such as fully opened fixing of the waste gate valve, that leads to significant decrease in the supercharging pressure can appropriately be diagnosed by the second abnormality determination. In other words, the abnormality of the supercharging system, which includes the abnormality with relatively small change being appeared in the supercharging pressure, can further appropriately be diagnosed.

The diagnostic method may be applied to the supercharging system as will be described below. The supercharging system may include a supercharger including an exhaust turbine and may also include the waste gate valve as the supercharging pressure lowering mechanism. The supercharger including the exhaust turbine type may supercharge by driving a compressor that is mounted in an intake passage of the internal combustion engine by a turbine that is mounted in an exhaust passage of the internal combustion engine and operated by a flow force of exhaust gas flowing in the exhaust passage. In addition, the waste gate valve may be mounted in a bypass passage that is used for the exhaust gas to bypass the exhaust turbine and flow through the bypass passage. The waste gate valve is configured to block the exhaust gas from flowing through the bypass passage when the waste gate valve is fully closed, and the waste gate valve is configured to permit the exhaust gas to flow through the bypass passage when the waste valve is opened. According to such a diagnostic method, presence or absence of slightly opened fixing of the waste gate valve can appropriately be determined by the first abnormality determination, and presence or absence of fully opened fixing of the waste gate valve can appropriately be determined by the second abnormality determination.

The diagnostic method may be applied to the supercharging system as will be described below. The supercharging system may include a mechanical supercharger as the supercharger and may also include a relief valve as the supercharging pressure lowering mechanism. The mechanical supercharger may be a supercharger that supercharges by driving the compressor that is mounted in the intake passage of the internal combustion engine by power of the internal combustion engine. In addition, the relief valve may be provided in a portion of the intake passage of the internal combustion engine that is on a downstream side of the compressor. The relief valve discharges some of the intake air flowing through the relief valve to the outside in accordance with valve opening, and blocks discharging from the relief valve when the relief valve is fully closed. According to such a diagnostic method, presence or absence of slightly opened fixing of the relief valve can appropriately be determined by the first abnormality determination, and presence or absence of fully opened fixing of the relief valve can appropriately be determined by the second abnormality determination.

In the diagnostic method, each of the first abnormality determination and the second abnormality determination may be made by determining that there is abnormality in the case where each of the first and the second air amount integrated values of the intake air amounts in each of the first and the second determination periods is deviated to a positive side from a value during a normal time that is assumed from each of the first and second peak supercharging pressures. In addition, in the diagnostic method, each of the first abnormality determination and the second abnormality determination may be made by determining that there is abnormality in the case where each of the first and the second peak supercharging pressures is deviated to a negative side from a value during a normal time that is assumed from each of the first and the second air amount integrated values of the intake air amounts in each of the periods.

It should be noted that the first and the second peak supercharging pressures respectively show higher correlation with the integrated values of the increased amounts of the intake air amounts than with the first and the second integrated values of the intake air amounts themselves. Thus, the first air amount integrated value of the intake air amount that is used in the first abnormality determination may be obtained by integrating the increased amount of the intake air amount from the initiation of the first determination period. In addition, the second air amount integrated value of the intake air amount that is used in the second abnormality determination may be obtained by integrating the increased amount of the intake air amount from the initiation of the second determination period. According to such a diagnostic method, the diagnoses can be made with the further improved accuracy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on a supercharging system and a diagnostic method for a supercharging system according to a first embodiment of the invention with reference to FIG. 1 to FIG. 7.

Figure 1:
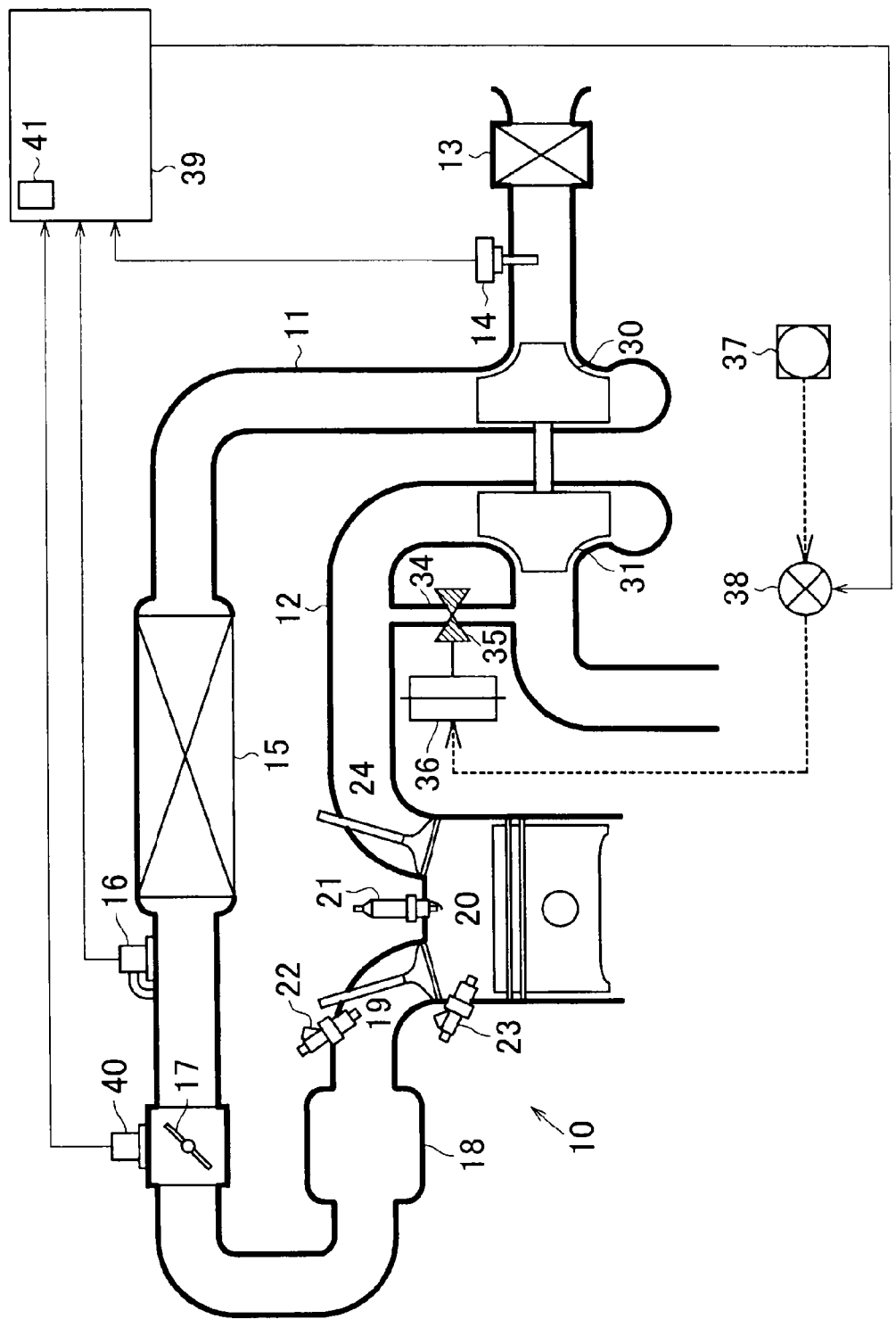
FIG. 1 is a schematic view of a configuration of a supercharging system according to a first embodiment as an example of the invention.

As depicted in FIG. 1, the supercharging system of this embodiment has a compressor 30 and an exhaust turbine type supercharger. The compressor 30 is mounted in an intake passage 11 of an internal combustion engine 10. The exhaust turbine type supercharger includes a turbine 31 that is mounted in an exhaust passage 12 of the internal combustion engine 10. The compressor 30 and the turbine 31 are mechanically coupled. It is configured that the compressor 30 is driven in conjunction with an operation of the turbine 31 by a flow force of exhaust gas, so as to perform a supercharging operation.

An air cleaner 13 and an airflow meter 14 are mounted in a portion of the intake passage 11 of the internal combustion engine 10 that is on an upstream side of the compressor 30. The air cleaner 13 purifies intake air. The airflow meter 14 is an intake air flow amount detecting section that detects a flow amount of the intake air (an intake air amount GA) that passes through the intake passage 11. Meanwhile, an intercooler 15, a supercharging pressure sensor 16, a throttle valve 17, and a surge tank 18 are sequentially provided from the upstream side in a portion of the intake passage 11 that is on a downstream side of the airflow meter 14. The intercooler 15 cools the intake air. The supercharging pressure sensor 16 is a supercharging pressure detecting section that detects supercharging pressure P. The throttle valve 17 adjusts the intake air amount GA. The surge tank 18 is a volume section for suppressing pulsation of the intake air. It should be noted that the supercharging pressure sensor 16 is configured to detect a differential pressure between absolute pressure of the intake air in a portion of the intake passage 11 between the compressor 30 and the throttle valve 17 and atmospheric pressure as the supercharging pressure P.

In addition, in the internal combustion engine 10, a port injector 22 that injects fuel into the intake air flowing through an intake port 19 is mounted in the intake port 19 as a connecting section of the intake passage 11 with a combustion chamber 20. Furthermore, an in-cylinder injector 23 and an ignition plug 21 are mounted in the combustion chamber 20. The in-cylinder injector 23 injects the fuel into the combustion chamber 20. The ignition plug 21 spark-ignites air-fuel mixture that is introduced into the combustion chamber 20. The exhaust passage 12, in which the above turbine 31 is mounted, is connected to the combustion chamber 20 via an exhaust port 24.

Moreover, the supercharging system includes a waste gate valve 35 as a supercharging pressure lowering mechanism. The waste gate valve 35 is mounted in a bypass passage 34 that is provided to connect between a portion of the exhaust passage 12 that is on an upstream side of the turbine 31 and a portion of the exhaust passage 12 that is on a downstream side thereof. Then, the waste gate valve 35 closes the bypass passage 34 during full closing thereof, blocks a flow of exhaust gas through the bypass passage 34, and permits the flow thereof in accordance with valve opening.

The waste gate valve 35 is coupled to a diaphragm 36 of a negative pressure driven type. An opening degree of the waste gate valve 35 is changed in accordance with a magnitude of the negative pressure that is introduced into the diaphragm 36. The diaphragm 36 is connected to a negative pressure pump 37 via a negative pressure adjusting valve 38. The negative pressure pump 37 is operated by rotation of a camshaft (not depicted) of the internal combustion engine 10 and generates the negative pressure. In this internal combustion engine 10, a vane-type mechanical pump is adopted as the negative pressure pump 37. Meanwhile, the negative pressure adjusting valve 38 is an electromagnetic valve for adjusting the magnitude of the negative pressure that is introduced into the diaphragm 36 in accordance with energization control.

The internal combustion engine 10 that is provided with such a supercharging system is controlled by an electronic control unit 39. The electronic control unit 39 includes a central processing unit (CPU) that executes various types of computation processing for engine control, a read only memory (ROM) in which programs and data for the control are stored, a random access memory (RAM) that temporarily stores computation results by the CPU, detection results by the sensors, and the like.

The electronic control unit 39 receives detection signals from various sensors that detect an operation state of the internal combustion engine 10, such as a throttle sensor 40 that detects an opening degree of the throttle valve 17 (a throttle opening degree TA), in addition to the airflow meter 14 and the supercharging pressure sensor 16 described above. In addition, an atmospheric pressure sensor 41 that detects the atmospheric pressure is installed in the electronic control unit 39. It should be noted that the energization control of the negative pressure adjusting valve 38 is also executed by this electronic control unit 39 in this supercharging system. It should also be noted that, in addition to a function as a controller of the internal combustion engine 10, the electronic control unit 39 also has a function as an abnormality determination section that determines presence or absence of abnormality of the supercharging system.

Such an electronic control unit 39 diagnoses slightly opened fixing of the waste gate valve 35 as a diagnosis of the abnormality of the supercharging system. The slightly opened fixing is the abnormality of the waste gate valve 35 that is fixed at a position slightly opened from a fully closed position and thus is not fully closed. It should be noted here that, in the case where the opening degree of the waste gate valve 35 (a WGV opening degree) is expressed by a valve opening angle from the fully closed position (the WGV opening degree during full opening=90°), fixing of the waste gate valve 35 at a position where the WGV opening degree is smaller than 5° is set as the slightly opened fixing.

During the slightly opened fixing, the waste gate valve 35 is not fully closed, and a slight amount of the exhaust gas is leaked in and flows through the bypass passage 34. Thus, a flow amount of the exhaust gas that passes through the turbine 31 is decreased by the leaked amount. However, since the decreased amount is slight, an influence thereof that appears as changes in the supercharging pressure and the intake air amount is limited. In this embodiment, a diagnostic method that can detect such slightly opened fixing with high accuracy is adopted. A description will hereinafter be made on the diagnostic method of such slightly opened fixing of the waste gate valve 35 in this embodiment.

Figure 2:
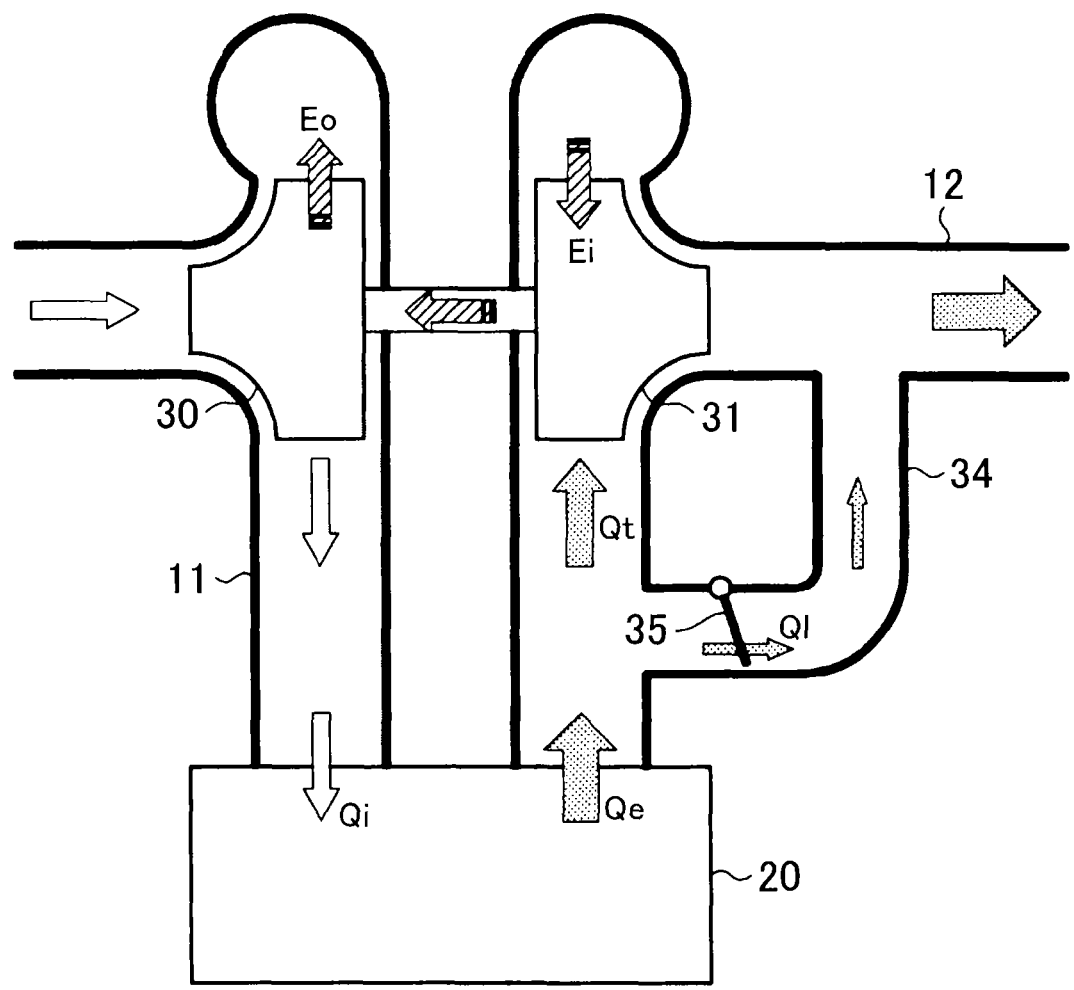
FIG. 2 is a model diagram that depicts movement of energy in the first embodiment.

As depicted in FIG. 2, in this supercharging system, the supercharging operation of the compressor 30 is performed by using energy Ei that the turbine 31 receives from the passing exhaust gas. The energy Ei, which the turbine 31 receives from the exhaust gas, has a positive correlation with the flow amount of the exhaust gas that passes through the turbine 31 (a turbine passing exhaust gas flow amount Qt). Here, if the waste gate valve 35 is fully closed, the turbine passing exhaust gas flow amount Qt equals a total flow amount of the exhaust gas that is discharged from the combustion chamber 20 (a total exhaust gas flow amount Qe) (Qt=Qe).

Meanwhile, the total exhaust gas flow amount Qe has a correlation with the flow amount of the intake air that flows into the combustion chamber 20 (a cylinder flow-in air amount Qi), and thus has a correlation with the intake air amount GA. Accordingly, it can be that the energy Eo in the supercharging operation of the compressor 30 during the full closing of the waste gate valve 35 is correlated with the intake air amount GA.

On the contrary, when the slightly opened fixing of the waste gate valve 35 occurs, the slight amount of the exhaust gas passes through the waste gate valve 35, which is not fully closed, and flows through the bypass passage 34. At this time, the turbine passing exhaust gas flow amount Qt becomes smaller than the total exhaust gas flow amount Qe by a flow amount of the exhaust gas in the bypass passage 34 (a leaked flow amount Ql) (Qt=Qe−Ql). In other words, the energy Eo in the supercharging operation of the compressor 30 at this time becomes slightly lower than a value that is predicted from the intake air amount GA.

It should be noted that, strictly speaking, the energy Eo in the supercharging operation of the compressor 30 is lower than the energy Ei that the turbine 31 receives from the exhaust gas due to loss by abrasion resistance and the like in the supercharging operation of the compressor 30. Such an energy loss amount (=Ei−Eo) is a value that corresponds to the intake air amount GA at a time that the compressor 30 initiates the supercharging operation. Thus, the energy Eo in the supercharging operation of the compressor 30 has a very high correlation with an increased amount of the intake air amount GA from the initiation of the supercharging operation.

Figure 3:
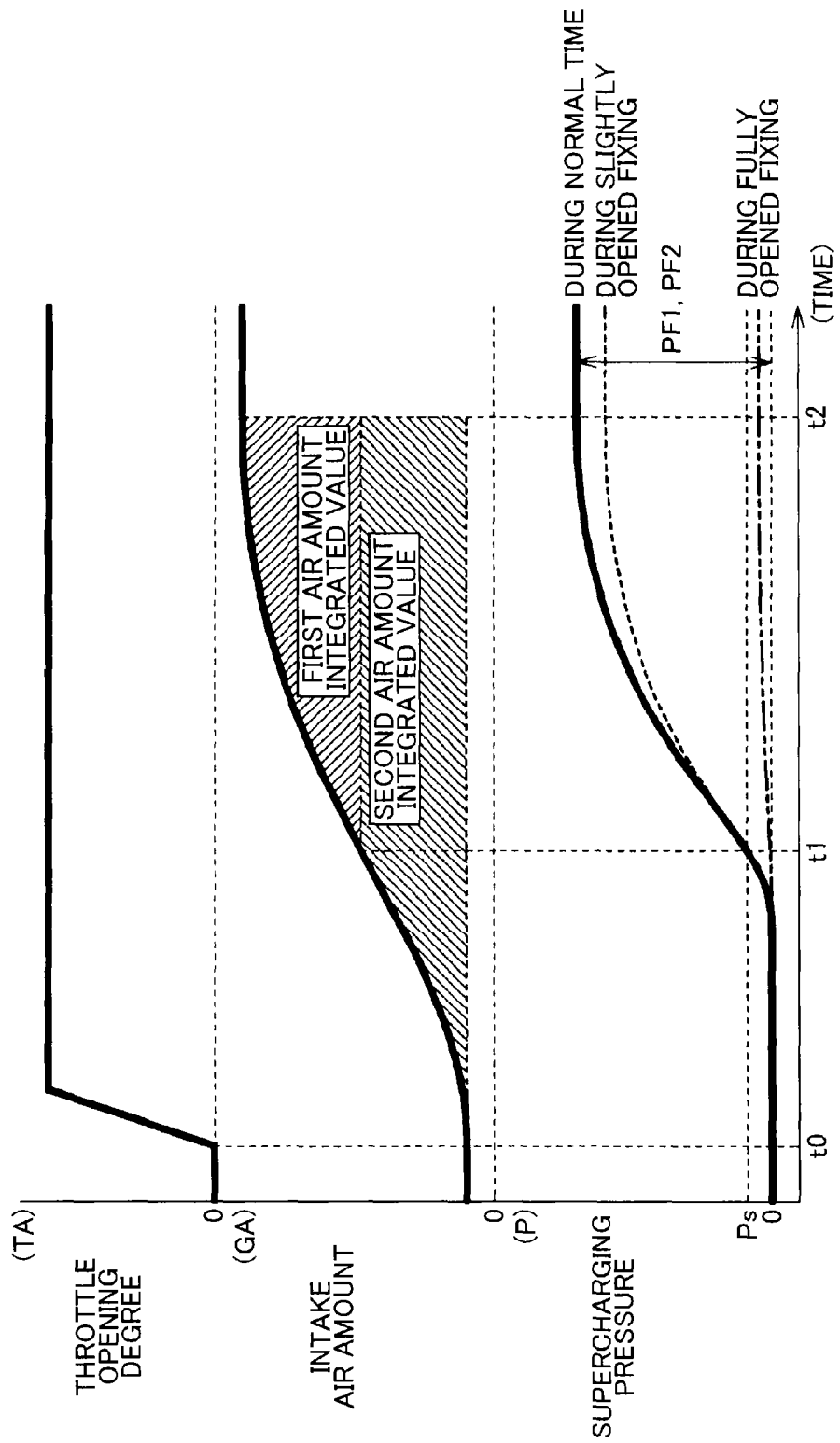
FIG. 3 is a time chart of changes in a throttle opening degree, an intake air amount, and supercharging pressure during a normal time, during slightly opened fixing, and during fully opened fixing of the supercharging system of the first embodiment.

FIG. 3 depicts changes in the throttle opening degree TA, the intake air amount GA, and the supercharging pressure P during acceleration of the internal combustion engine 10 when the waste gate valve 35 functions normally. Once the throttle opening degree TA is increased from "0" at time t0 in the chart, the intake air amount GA is gradually increased thereafter.

Meanwhile, an increase in the supercharging pressure P is initiated after each of the following processes (i) to (v) is undergone. The transition from/into each of these processes is accompanied by delays in carriage of the intake air and the exhaust gas. Thus, the increase in the supercharging pressure P is initiated after a certain time has elapsed since an increase in the intake air amount GA is initiated:

(i) the increase in the intake air amount GA in conjunction with an increase in the throttle opening degree TA;
(ii) an increase in the cylinder flow-in air amount Qi in conjunction with the increase in the intake air amount GA;
(iii) an increase in a discharge amount of the exhaust gas from the combustion chamber 20 (the total exhaust gas flow amount Qe) in conjunction with the increase in the cylinder flow-in air amount Qi;
(iv) an increase in the turbine passing exhaust gas flow amount Qt in conjunction with the increase in the total exhaust gas flow amount Qe; and
(v) an increase in an operation amount of the turbine 31 and thus a supercharging operation amount of the compressor 30 in conjunction with the increase in the turbine passing exhaust gas flow amount Qt.

There are large fluctuations in a response delay time until the initiation of such supercharging, and it is thus difficult to predict the initiation. In view of this, in this embodiment, the supercharging is regarded as being initiated (the increase in the supercharging pressure P is initiated) when the supercharging pressure P becomes equal to or higher than predetermined supercharging initiation pressure Ps. By the way, the supercharging initiation pressure Ps is set at pressure that is slightly higher than a maximum value of the supercharging pressure P when the waste gate valve 35 is fully opened.

Once the supercharging is initiated, a following cycle is thereafter repeated for a while: the increase in the cylinder flow-in air amount Qi by the increase in the supercharging pressure P→the increase in the turbine passing exhaust gas flow amount Qt→the increase in the supercharging operation amount of the compressor 30→the further increase in the supercharging pressure P. Consequently, the intake air amount GA and the supercharging pressure P are increased. However, the increases eventually reach points of saturation, and the intake air amount GA and the supercharging pressure P settle at certain values.

As described above, the energy Eo in the supercharging operation of the compressor 30 is correlated with an increased amount of the flow amount of the intake air from the initiation of the supercharging. Here, the intake air amount GA at time t1 in the chart at which the supercharging pressure P exceeds the supercharging initiation pressure Ps is regarded as the intake air amount upon initiation of the supercharging. In this case, a total amount of the energy Eo in the supercharging operation of the compressor 30 in a period from the time t1 to time t2 at which the increase in the supercharging pressure P is terminated, that is, in a period from the initiation to the termination of the increase in the supercharging pressure P corresponds to an area indicated by hatching in the chart. It should be noted that, since the energy Eo in the supercharging operation of the compressor 30 is consumed to increase the supercharging pressure P, the above total amount of the energy Eo is correlated with an increased amount of the supercharging pressure P in the above period (hereinafter described as first peak supercharging pressure PF1).

The area of this region corresponds to an integrated value of the increased amount of the intake air amount GA from the time at which the increase in the supercharging pressure P is initiated (the time t1) in the period from the time t1 to the time t2. Hereinafter, the period from the initiation of the increase in the supercharging pressure P to the termination thereof is described as a first determination period, and the integrated value of the increased amount of the above intake air amount GA in the first determination period is described as a first air amount integrated value TGA1.

In the chart, the change in the supercharging pressure P in the case where the slightly opened fixing of the waste gate valve 35 occurs is indicated by a dotted line. It should be noted that an influence of the slightly opened fixing also appears in the intake air amount GA. However, as a matter of convenience, the intake air amount GA is changed in the same manner as that in the normal time.

As described above, when the slightly opened fixing occurs, the turbine passing exhaust gas flow amount Qt becomes smaller than the total exhaust gas flow amount Qe. Accordingly, the energy Eo in the supercharging operation of the compressor 30 becomes lower than the value that is predicted from the intake air amount GA (the increased amount of the intake air amount GA from the time at which the increase in the supercharging pressure P is initiated). Thus, although the first air amount integrated value TGA1 is the same, the first peak supercharging pressure PF1 at this time becomes lower than that in the normal time. In other words, when the first peak supercharging pressure PF1 is the same, the first air amount integrated value TGA1 during the slightly opened fixing becomes higher than that in the normal time. In view of this, in this embodiment, presence or absence of the slightly opened fixing is diagnosed by making a determination on the presence or absence of the abnormality based on a relationship between the first air amount integrated value TGA1 and the first peak supercharging pressure PF1 in the first determination period (hereinafter described as a first abnormality determination).

Meanwhile, the abnormality of the supercharging system also includes so-called fully opened fixing, that is, the waste gate valve 35 being fixed at a fully opened position or in the vicinity thereof. In FIG. 3, which is described above, the change in the supercharging pressure P during the fully opened fixing is indicated by a two-dot chain line. Upon occurrence of such fully opened fixing, most of the exhaust gas flows through the bypass passage 34, and the exhaust gas hardly flows into the turbine 31. Thus, the supercharging pressure P at this time is hardly increased, and there is a case where the supercharging pressure P does not reach the supercharging initiation pressure Ps until the increase in the intake air amount GA is terminated. In such a case, the initiation of the increase in the supercharging pressure P cannot be confirmed, and the first abnormality determination as described above cannot be made in the first place.

For the above reason, the following abnormality determination is concurrently made with the above first abnormality determination in this embodiment. More specifically, in this embodiment, a second air amount integrated value TGA2 is concurrently computed with the computation of the first air amount integrated value TGA1 in the first determination period. This second air amount integrated value TGA2 is an integrated value of the increased amount of the intake air amount GA in a second determination period that is from the initiation of the increase in the intake air amount GA to the termination of the increase in the supercharging pressure P. Then, the determination of the presence or absence of the abnormality that is based on a relationship between second peak supercharging pressure PF2 that is the increased amount of the supercharging pressure P in the second determination period and the thus-computed second air amount integrated value TGA2 (hereinafter described as a second abnormality determination) is separately made from the first abnormality determination.

It should be noted that such a second determination period includes a period of a response delay in a rise of (the initiation of the increase in) the supercharging pressure P with large fluctuations. Thus, a correlation between the second air amount integrated value TGA2 and the second peak supercharging pressure PF2 in the second determination period is not as high as the correlation between the first air amount integrated value TGA1 and the first peak supercharging pressure PF1 in the first determination period. However, there is an obvious difference in the second peak supercharging pressure PF2 between the time of the fully opened fixing and the normal time. Thus, even with such a second abnormality determination, presence or absence of the fully opened fixing can sufficiently be detected.

Figure 4:
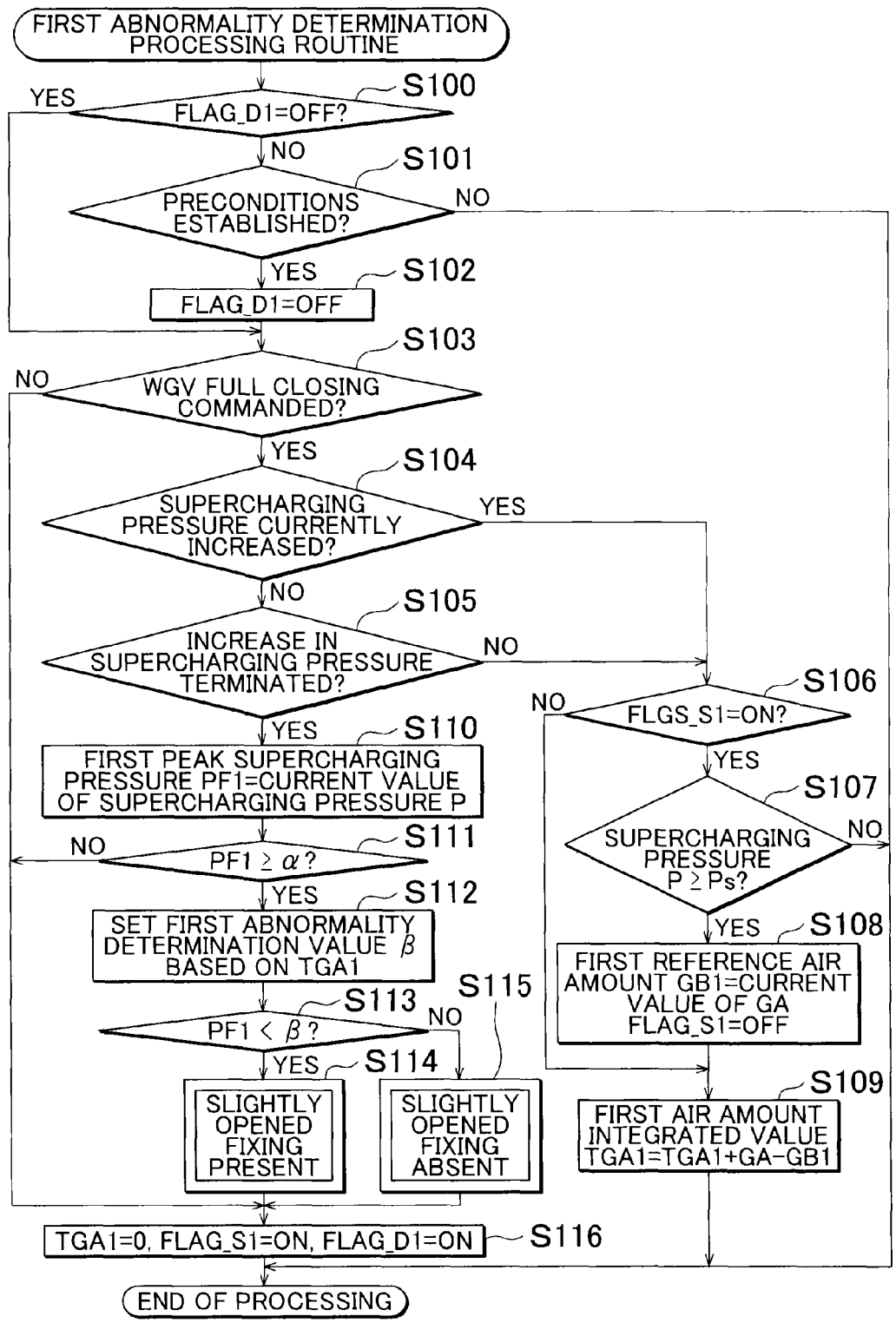
FIG. 4 is a flowchart of processing procedures of a first abnormality determination processing routine that is executed in the first embodiment.

FIG. 4 is a flowchart of a first abnormality determination processing routine that is executed to make the above first abnormality determination. The processing of the routine is repeatedly executed by the electronic control unit 39 at each predetermined control interval during the operation of the internal combustion engine 10.

Once this routine is initiated, it is first determined in step S100 whether a first abnormality determination completed flag FLAG_D1 is cleared (OFF). If the first abnormality determination completed flag FLAG_D1 is cleared here (YES), the processing proceeds to step S103. If the first abnormality determination completed flag FLAG_D1 is set (ON) (NO), the processing proceeds to step S101.

If the processing proceeds to step S101, it is determined in step S101 whether preconditions for the determination are established. The preconditions for the determination include that the supercharging is not performed (the supercharging pressure P≅0), that an speed of the internal combustion engine 10 is in a specified range, that the intake air amount GA is in a specified range, that warming of the internal combustion engine 10 is completed, and the like. Here, if the preconditions for the determination are established (YES), the processing proceeds to step S102. If not established (NO), the current processing of this routine is terminated as is.

If the processing proceeds to step S102, the first abnormality determination completed flag FLAG_D1 is cleared (OFF) in step S102, and the first abnormality determination is thereby initiated. Then, the processing proceeds to step S103.

When the processing proceeds to step S103, it is determined in step S103 whether full closing of the waste gate valve 35 is commanded. The presence or absence of the fully closed command of the waste gate valve 35 is determined, for example, based on whether an energization amount of the negative pressure adjusting valve 38 corresponds to a value during the full closing. Here, if the fully closing of the waste gate valve 35 is commanded (YES), the processing proceeds to step S104. On the other hand, if the fully closing of the waste gate valve 35 is not commanded (NO), clear processing is executed, that is, the first air amount integrated value TGA1 is reset (TGA1=0), and a first integration completed flag FLAG_S1 and the first abnormality determination completed flag FLAG_D1 are set (ON) in step S116. Then, the current processing of this routine is terminated.

If the processing proceeds to step S104, it is determined in step S104 whether the supercharging pressure P is currently increased. If the supercharging pressure P is currently increased (YES), the processing proceeds to step S106. If not currently increased (NO), the processing proceeds to step S105.

If the processing proceeds to step S105, it is determined in step S105 whether the increase in the supercharging pressure P has been terminated. The determination on whether the increase in the supercharging pressure P has been terminated is made based on whether a state that an increase rate of the supercharging pressure P is either a value near "0" or a negative value continues for a specified time. Here, if the increase in the supercharging pressure P has been terminated (YES), the processing proceeds to step S110. If not terminated (NO), the processing proceeds to step S106.

If the processing proceeds to step S106, integration processing of the first air amount integrated value TGA1 is executed in step S106 to step S109. More specifically, it is determined in step S106 whether the first integration completed flag FLAG_S1 is set (ON). Here, if the first integration completed flag FLAG_S1 is set (YES), the processing proceeds to step S107. If the first integration completed flag FLAG_S1 is cleared (OFF) (NO), the processing proceeds to step S109.

If the processing proceeds to step S107, it is determined in step S107 whether the supercharging pressure P is equal to or higher than the supercharging initiation pressure Ps. In other words, it is determined here whether the increase in the supercharging pressure P has been initiated. If the supercharging pressure P is lower than the supercharging initiation pressure Ps and it is thus determined that the increase therein has not been initiated (NO), the current processing of this routine is terminated as is.

On the other hand, if the supercharging pressure P is equal to or higher than the supercharging initiation pressure Ps and it is thus determined that the increase therein has been initiated (YES), the processing proceeds to step S108. In step S108, a current value of the intake air amount GA is set as a first reference air amount GB1, and the first integration completed flag FLAG_S1 is cleared (OFF). Thereafter, the processing proceeds to step S109.

When the processing proceeds to step S109, in step S109, a value that is obtained by subtracting the first reference air amount GB1 from the current value of the intake air amount GA is added to the current first air amount integrated value TGA1, and the first air amount integrated value TGA1 is thereby updated. Thereafter, the current processing of this routine is terminated.

It should be noted that, if it is determined in above-described step S105 that the increase in the supercharging pressure P has been terminated and thus the processing proceeds to step S110, abnormality determination processing in the first abnormality determination is executed in step S110 to step S115. More specifically, in step S110, a current value of the supercharging pressure P is set as the first peak supercharging pressure PF1. In this embodiment, the first abnormality determination is initiated in a state that the supercharging is not performed, that is, a state that the supercharging pressure P is approximately zero. Accordingly, the supercharging pressure P at this time equals the increased amount of the supercharging pressure P in the first determination period.

In following step S111, it is determined whether the first peak supercharging pressure PF1 is equal to or higher than a specified value α. This determination is made to check whether the supercharging pressure P is increased enough to make the first abnormality determination with sufficient accuracy. It should be noted that the specified value α is set at a slightly higher value than the supercharging initiation pressure Ps.

If the first peak supercharging pressure PF1 has not reached the specified value α here (NO), the processing proceeds above step S116 without making the determination based on the first air amount integrated value TGA1 and the first peak supercharging pressure PF1 in the current first determination period. Then, after the clear processing is executed in step S116, the current processing of this routine is terminated.

On the other hand, if the first peak supercharging pressure PF1 is equal to or higher than the specified value α (YES), the processing proceeds to step S112. Then, a first abnormality determination value β that is based on the first air amount integrated value TGA1 is set in step S112. At this time, the first abnormality determination value β is set at a slightly lower value than a lower limit value in a predicted range of the value of the first peak supercharging pressure PF1 that is predicted from the first air amount integrated value TGA1 at the time that the supercharging system is operated normally. Such a first abnormality determination value β becomes a higher value as the first air amount integrated value TGA1 is increased.

Then, in following step S113, it is determined whether the first peak supercharging pressure PF1 is lower than the first abnormality determination value β. Here, if the first peak supercharging pressure PF1 is lower than the first abnormality determination value β (YES), it is determined in step S114 that the slightly opened fixing of the waste gate valve 35 is present. If the first peak supercharging pressure PF1 is equal to or higher than the first abnormality determination value β (NO), it is determined in step S115 that the slightly opened fixing of the waste gate valve 35 is absent. Then, after making either one of these determinations, the above-described clear processing in step S116 is executed. Thereafter, the current processing of this routine is terminated.

Figure 5:
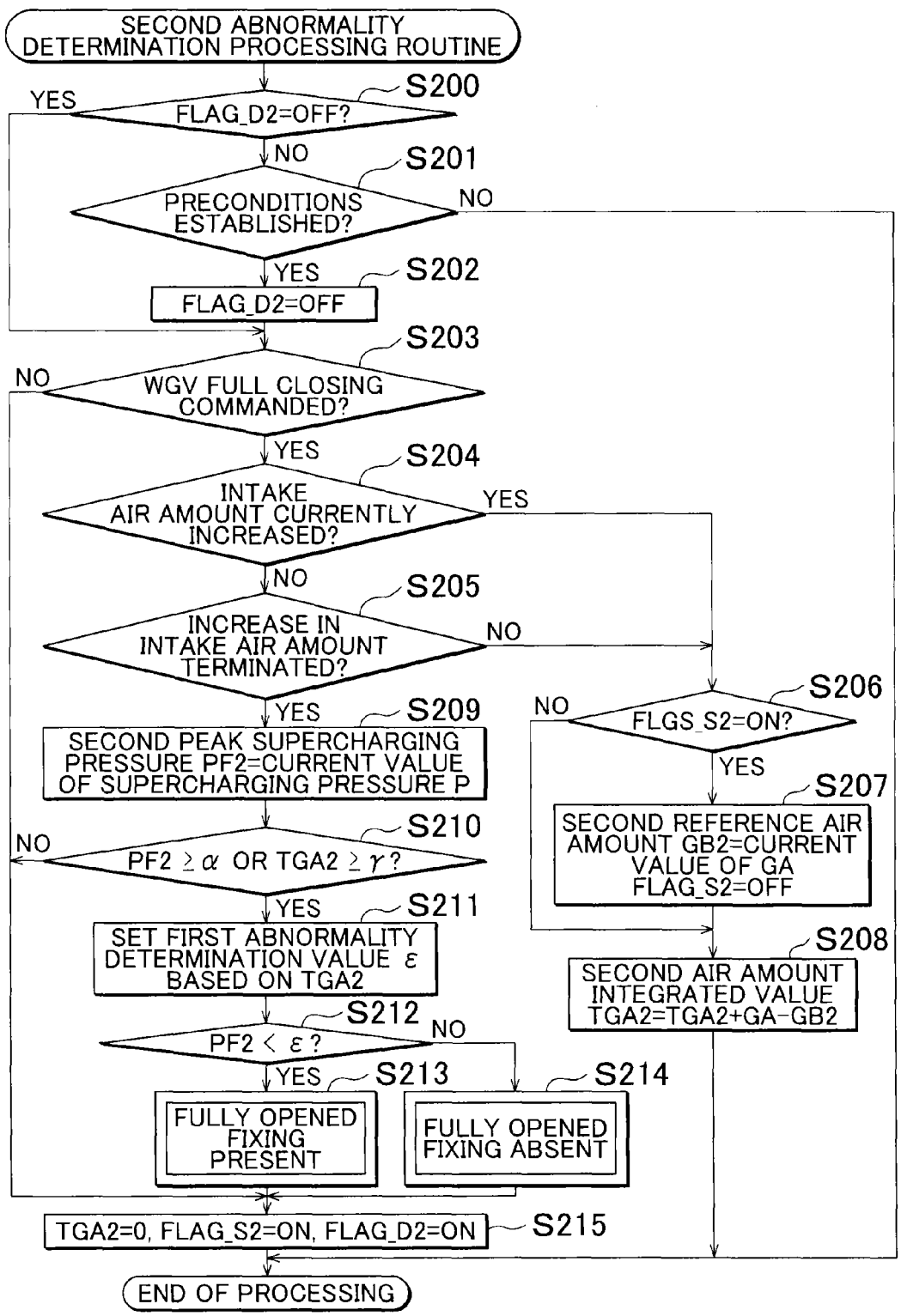
FIG. 5 is a flowchart of processing procedures of a second abnormality determination processing routine that is executed in the first embodiment.

FIG. 5 is a flowchart of a second abnormality determination processing routine that is executed to make the second abnormality determination for the determination of the fully opened fixing described above. The processing of this routine is repeatedly executed by the electronic control unit 39 at each predetermined control interval during the operation of the internal combustion engine 10.

Once this routine is initiated, it is first determined in step S200 whether a second abnormality determination completed flag FLAG_D2 is cleared (OFF). If the second abnormality determination completed flag FLAG_D2 is cleared here (YES), the processing proceeds to step S203. If the second abnormality determination completed flag FLAG_D2 is set (ON) (NO), the processing proceeds to step S201.

If the processing proceeds to step S201, it is determined in step S201 whether the preconditions for the determination are established. These preconditions for the determination are shared with the first abnormality determination processing routine. If the preconditions for the determination are established here (YES), the processing proceeds to step S202. If not established (NO), the current processing of this routine is terminated as is.

If the processing proceeds to step S202, the second abnormality determination completed flag FLAG_D2 is cleared (OFF) in step S202, and the second abnormality determination is thereby initiated. Thereafter, the processing proceeds to step S203.

When the processing proceeds to step S203, it is determined in step S203 whether the fully closing of the waste gate valve 35 is commanded. If the fully closing of the waste gate valve 35 is commanded (YES), the processing proceeds to step S204. If not (NO), clear processing is executed in step S215, and thereafter the current processing of this routine is terminated. It should be noted that, in the clear processing at this time, the second air amount integrated value TGA2 is reset (TGA2=0), and a second integration completed flag FLAG_S2 and the second abnormality determination completed flag FLAG_D2 are set (ON).

If the processing proceeds to step S204, it is determined in step S204 whether the intake air amount GA is currently increased. If the intake air amount GA is currently increased (YES), the processing proceeds to step S206. If not currently increased (NO), the processing proceeds to step S205.

If the processing proceeds to step S205, it is determined in step S205 whether the increase in the intake air amount GA has been terminated. The presence or absence of termination of the increase in the intake air amount GA is determined based on whether a state that an increase rate of the intake air amount GA is either a value near "0" or a negative value continues for a specified time. Here, if the increase in the intake air amount GA has been terminated (YES), the processing proceeds to step S209. If not terminated (NO), the processing proceeds to step S206.

If the processing proceeds to step S206, integration processing of the second air amount integrated value TGA2 is executed in step S206 to step S208. More specifically, it is determined in step S206 whether the second integration completed flag FLAG_S2 is set (ON). If the second integration completed flag FLAG_ S2 is set here (YES), the processing proceeds to step S207. If the second integration completed flag FLAG_S2 is cleared (NO), the processing proceeds to step S208.

If the processing proceeds to step S207, in step S207, the current value of the intake air amount GA is set as a second reference air amount GB2, and the second integration completed flag FLAG_S2 is cleared (OFF). Thereafter, the processing proceeds to step S208.

When the processing proceeds to step S208, in step S208, a value that is obtained by subtracting the second reference air amount GB2 from the current value of the intake air amount GA is added to the current second air amount integrated value TGA2, and the second air amount integrated value TGA2 is thereby updated. Thereafter, the current processing of this routine is terminated.

It should be noted that, if it is determined in above-described step S205 that the increase in the intake air amount GA has been terminated and the processing proceeds to step S209, the abnormality determination processing in the second abnormality determination is executed in step S209 to step S214. More specifically, in step S209, the current value of the supercharging pressure P is set as the second peak supercharging pressure PF2. In following step S210, it is determined whether at least one of that the second peak supercharging pressure PF2 is equal to or higher than the above specified value α and that the second air amount integrated value TGA2 is equal to or higher than a specified value α is established. It should be noted that, since the second abnormality determination is also initiated in the state that the supercharging pressure P is approximately zero in this embodiment, the supercharging pressure P at this time equals the increased amount of the supercharging pressure P in the second determination period.

Here, if the second peak supercharging pressure PF2 is lower than the specified value α and the second air amount integrated value TGA2 is lower than the specified value γ (NO), the clear processing is executed in above-described step S215, and thereafter the current processing of this routine is terminated.

On the other hand, if the second peak supercharging pressure PF2 is equal to or higher than the specified value α, or if the second air amount integrated value TGA2 is equal to or higher than the specified value γ (YES), the processing proceeds to step S211. Then, a second abnormality determination value ε that is based on the second air amount integrated value TGA2 is set in step S211. At this time, the second abnormality determination value ε is set at a slightly lower value than a lower limit value in a predicted range of the second peak supercharging pressure PF2 that is predicted from the second air amount integrated value TGA2 at the time that the supercharging system is operated normally. Such a second abnormality determination value ε becomes a higher value as the second air amount integrated value TGA2 is increased.

Then, it is determined in following step S212 whether the second peak supercharging pressure PF2 is lower than the second abnormality determination value ε. Here, if the second peak supercharging pressure PF2 is lower than the second abnormality determination value ε (YES), it is determined in step S213 that the fully opened fixing of the waste gate valve 35 is present. If the second peak supercharging pressure PF2 is equal to or higher than the second abnormality determination value ε (NO), it is determined in step S214 that the fully opened fixing of the waste gate valve 35 is absent. Then, after making either one of these determinations, the clear processing in above-described step S215 is executed. Thereafter, the current processing of this routine is terminated.

Next, according to execution results of these first abnormality determination processing routine and second abnormality determination processing routine, the abnormality determination is made in the following aspect. First, a description will be made on the first abnormality determination that is made through the processing in the first abnormality determination processing routine.

When the preconditions for the determination are established, the first abnormality determination completed flag FLAG_D1 is cleared, and the first abnormality determination is initiated. When the intake air amount GA is increased thereafter by depression of an accelerator pedal, the supercharging pressure P starts being increased after a lapse of the period of the response delay in the rise. Then, when the supercharging pressure P is increased to the supercharging initiation pressure Ps, the first integration completed flag FLAG_S1 is cleared, and the intake air amount GA at the time is set as the first reference air amount GB1. Then, the integration processing of the first air amount integrated value TGA1 is initiated. In other words, every time this routine is executed, the value that is obtained by subtracting the first reference air amount GB1 from the intake air amount GA is added to the first air amount integrated value TGA1. It should be noted that the subtraction value of the first reference air amount GB1 from the intake air amount GA, which is added at this time, corresponds to the increased amount of the intake air amount GA from the initiation of the increase in the supercharging pressure P.

Such integration processing of the first air amount integrated value TGA1 continues until the increase in the supercharging pressure P is terminated. Accordingly, the first air amount integrated value TGA1 is a value that is obtained by integrating the increased amount of the intake air amount GA from the initiation of the increase in the supercharging pressure P in the first determination period from the initiation of the increase therein to the termination of the increase therein.

Then, when the increase in the supercharging pressure P is terminated, the supercharging pressure P at the time is set as the first peak supercharging pressure PF1. This first peak supercharging pressure PF1 corresponds to the increased amount of the supercharging pressure P in the current first determination period from the initiation to the termination of the increase in the supercharging pressure P.

Here, if the first peak supercharging pressure PF1 is lower than the specified value α, it is considered that the supercharging pressure P is not increased enough to make the first abnormality determination with sufficient accuracy. Accordingly, the computation results of the first air amount integrated value TGA1 and the first peak supercharging pressure PF1 in the current first determination period are abandoned, and the determination is suspended. On the other hand, if the first peak supercharging pressure PF1 is equal to or higher than the specified value α, the presence or absence of the slightly opened fixing of the waste gate valve 35 is determined based on a comparison between the first abnormality determination value β, which is set based on the first air amount integrated value TGA1, and the first peak supercharging pressure PF1 thereof.

Figure 6:
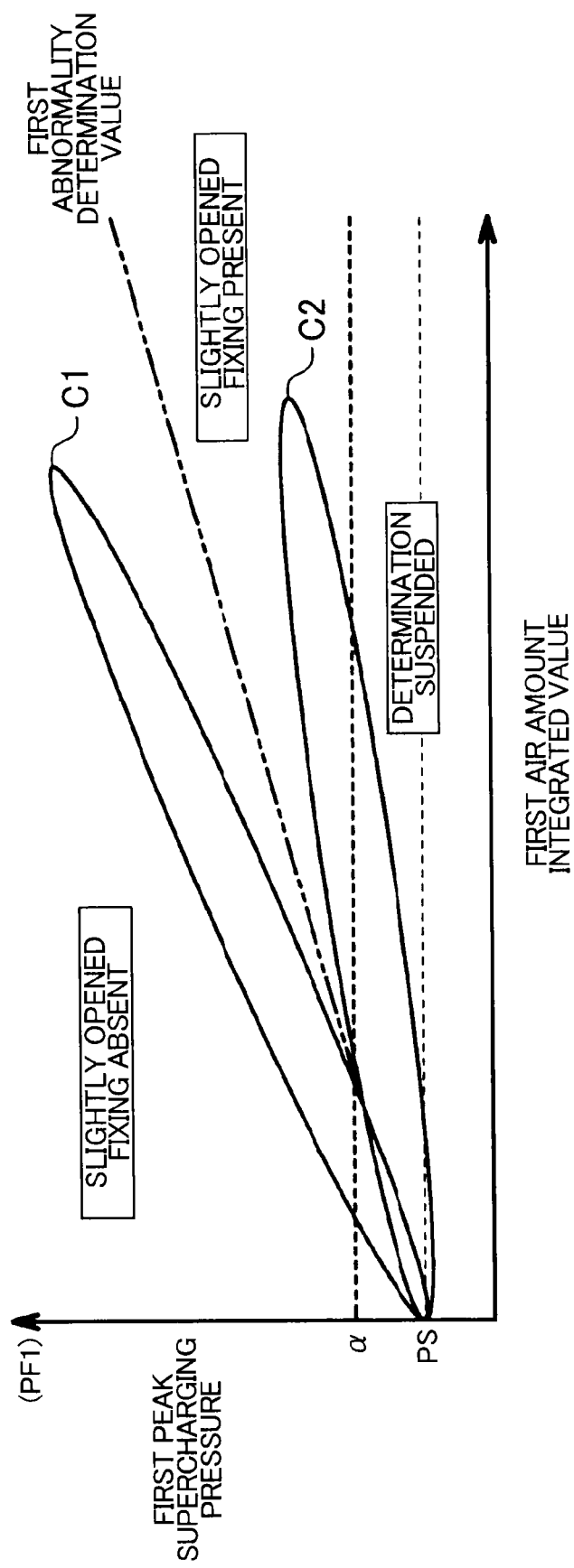
FIG. 6 is a graph of determination patterns of the first abnormality determination in the first embodiment.

FIG. 6 depicts determination patterns of the first abnormality determination. As indicated in the graph, when the first peak supercharging pressure PF1 is lower than the first abnormality determination value β, that is, when the first peak supercharging pressure PF1 does not reach the value that is predicted from the first air amount integrated value TGA1 at the time, it is determined that the slightly opened fixing of the waste gate valve 35 is present. On the other hand, when the first peak supercharging pressure PF1 is equal to or higher than the first abnormality determination value β and reaches the value that is predicted from the first air amount integrated value TGA1 at the time, it is determined that the slightly opened fixing of the waste gate valve 35 is absent. By the way, the first peak supercharging pressure PF1 does not reach the specified value α during the fully opened fixing of the waste gate valve 35. Thus, the first abnormality determination in this case is suspended.

It should be noted that a first region C1 in the graph indicates a distribution range of the values of the first peak supercharging pressure PF1 and the first air amount integrated value TGA1 during the normal time. A second region C2 indicates a distribution range of these values during the slightly opened fixing. As indicated in the graph, in a region where the first peak supercharging pressure PF1 is equal to or higher than the specified value α, the distribution range in the normal time (C1) and the distribution range during the slightlyopened fixing (C2) are respectively separated from each other on an upper side and a lower side in the graph with a line that indicates the first abnormality determination value β being interposed therebetween. Accordingly, these ranges can clearly be distinguished from each other by the above first abnormality determination.

By the way, in addition to the slightly opened fixing of the waste gate valve 35, the abnormality of the supercharging system that leads to relatively little degradation in supercharging efficiency can also be diagnosed in such a first abnormality determination. For example, a decrease in an opening area of an inlet or an outlet of the intake air/the exhaust gas of the compressor 30 or the turbine 31, which is caused by a foreign substance, can also be diagnosed by this first abnormality determination.

Next, a description will be made on the second abnormality determination that is made through the processing of the second abnormality determination processing routine. When the preconditions for the determination are established, the second abnormality determination completed flag FLAG_D2 is cleared, and the second abnormality determination is initiated. Thereafter, when the intake air amount GA is increased by the depression of the accelerator pedal, the second integration completed flag FLAG_S2 is cleared, and the intake air amount GA at the time is set as the second reference air amount GB2. Then, the integration processing of the second air amount integrated value TGA2 is initiated. In other words, every time this routine is executed, the value that is obtained by subtracting the second reference air amount GB2 from the intake air amount GA is added to the second air amount integrated value TGA2. It should be noted that a subtraction value of the second reference air amount GB2 from the intake air amount GA, which is added at this time, corresponds to the increased amount of the intake air amount GA from the initiation of the increase in the intake air amount GA.

The integration processing of such a second air amount integrated value TGA2 continues until the increase in the intake air amount GA is terminated. It should be noted that the increase in the intake air amount GA and the increase in the supercharging pressure P are terminated almost simultaneously. Thus, the second air amount integrated value TGA2 is a value that is obtained by integrating the increased amount of the intake air amount GA from the initiation of the increase in the intake air amount GA in the second determination period that is from the initiation thereof to the termination of the increase in the supercharging pressure P.

Then, the increase in the intake air amount GA and thus the supercharging pressure P is terminated, the supercharging pressure P at the time is set as the second peak supercharging pressure PF2. This second peak supercharging pressure PF2 corresponds to the increased amount of the supercharging pressure P in the second determination period that is from the initiation of the increase in the current intake air amount GA to the termination of the increase in the supercharging pressure P.

It should be noted that, when the increased amount of the intake air amount GA is not very large, the supercharging pressure P may not be increased significantly even in the normal state. In such a case, even with the second abnormality determination, it is difficult to distinguish the normal state and the fully opened fixing from each other. Thus, when the second peak supercharging pressure PF2 is lower than the specified value $\alpha$ and the second air amount integrated value TGA2 is lower than the specified value $\gamma$, the computation results of the second air amount integrated value TGA2 and the second peak supercharging pressure PF2 in the current second determination period are abandoned, and the determination is suspended. On the other hand, when the second peak supercharging pressure PF2 is equal to or higher than the specified value $\alpha$ or the second air amount integrated value TGA2 is equal to or higher than the specified value $\gamma$, the presence or absence of the fully opened fixing of the waste gate valve 35 is determined based on the comparison between the second abnormality determination value $\epsilon$, which is set based on the second air amount integrated value TGA2, and the second peak supercharging pressure PF2 thereof.

Figure 7:
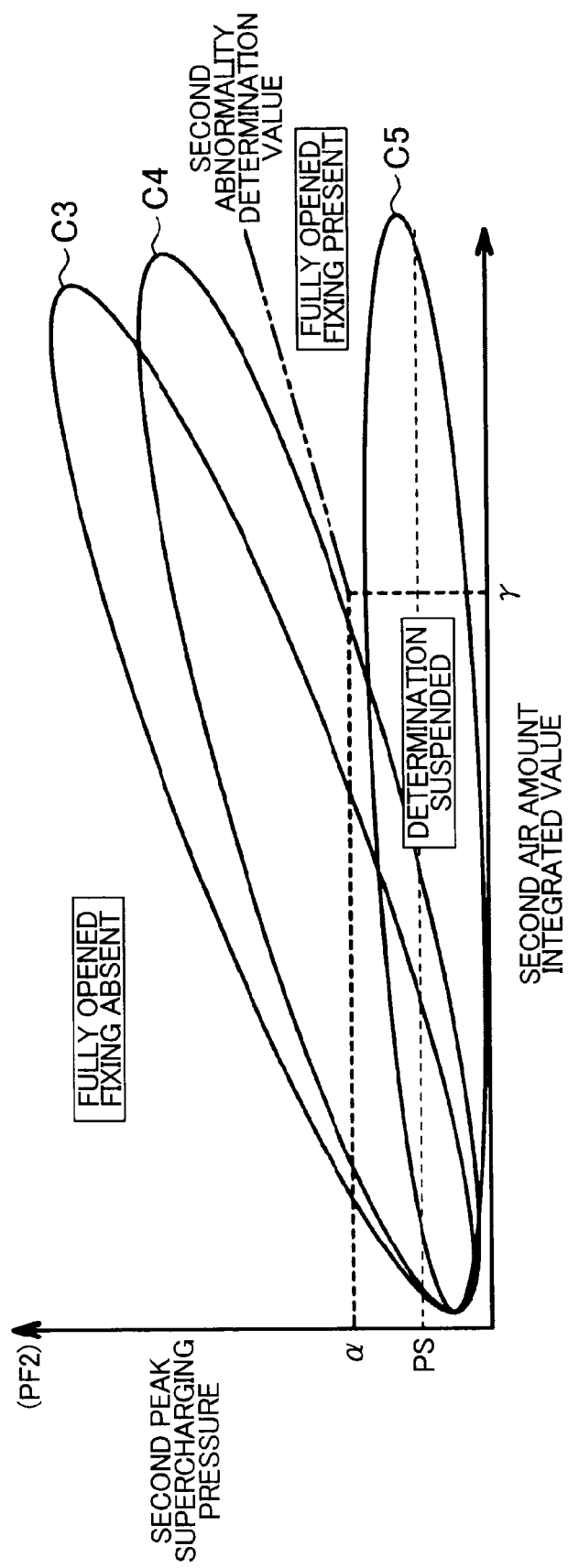
FIG. 7 is a graph of determination patterns of the second abnormality determination in the first embodiment.

FIG. 7 depicts determination patterns of the second abnormality determination. As depicted in the graph, in a region where the second peak supercharging pressure PF2 is equal to or higher than the specified value $\alpha$ or the second air amount integrated value TGA2 is equal to or higher than the specified value $\gamma$, it is determined that the fully opened fixing of the waste gate valve 35 is present if the second peak supercharging pressure PF2 is lower than the second abnormality determination value $\epsilon$. In addition, in the above region, if the second peak supercharging pressure PF2 is equal to or higher than the second abnormality determination value $\epsilon$, it is determined that the fully opened fixing of the waste gate valve 35 is absent. On the other hand, if the second peak supercharging pressure PF2 is lower than the specified value $\alpha$ and the second air amount integrated value TGA2 is lower than the specified value $\gamma$, the second abnormality determination is suspended.

It should be noted that a third region C3 in the graph indicates a distribution range of the values of the second peak supercharging pressure PF2 and the second air amount integrated value TGA2 during the normal time. A fourth region C4 indicates a distribution range of these values during the slightly opened fixing. A fifth region C5 indicates a distribution range of these values during the fully-opened fixing. As depicted in the graph, the distribution ranges (C3, C4) during the normal time and the slightly opened fixing widely overlap with each other, and thus it is difficult to distinguish these from each other in the second abnormality determination. Meanwhile, in the region where the second peak supercharging pressure PF2 is equal to or higher than the specified value $\alpha$ or the second air amount integrated value TGA2 is equal to or higher than the specified value $\gamma$, the distribution ranges (C3, C4) during the normal time and the slightlyopened fixing and the distribution range (C5) during the fully opened fixing respectively separate from each other on an upper side and a lower side in the graph with a line that indicates the second abnormality determination value $\epsilon$ being interposed therebetween. Thus, it is possible in the second abnormality determination to favorably determine the presence or absence of the fully opened fixing.

By the way, in addition to the fully opened fixing of the waste gate valve 35, the abnormality of the supercharging system that leads to significant degradation in the supercharging efficiency can also be diagnosed in such a second abnormality determination. For example, operation failure of the compressor 30 or the turbine 31 can also be diagnosed by this second abnormality determination.

It should be noted that, in this embodiment described above, the electronic control unit 39 makes both of the first abnormality determination that is made by a first abnormality determination section and the second abnormality determination that is made by a second abnormality determination section. According to the supercharging system and the diagnostic method therefor of this embodiment that have been described so far, the following effects can be attained.

(1) In this embodiment, two types of abnormality determination, which are the first abnormality determination and the second abnormality determination, are made. The first abnormality determination is the determination on the presence or absence of the abnormality of the supercharging system based on the first air amount integrated value TGA1 and the first peak supercharging pressure PF1 in the first determination period. The second abnormality determination is the determination on the presence or absence of the abnormality of the supercharging system based on the second air amount integrated value TGA2 and the second peak supercharging pressure PF2 in the second determination period. Here, the first determination period is the period from the initiation of the increase in the supercharging pressure P that occurs after the initiation of the increase in the intake air amount GA to the termination thereof. The second determination period is the period from the initiation of the increase in the intake air amount GA to the termination of the increase in the supercharging pressure P. In addition, the first air amount integrated value TGA1 is the integrated value of the intake air amount GA in the first determination period (more strictly, the integrated value of the increased amount of the intake air amount GA from the initiation of the first determination period). The second air amount integrated value TGA2 is the integrated value of the intake air amount GA in the second determination period (more strictly, the integrated value of the increased amount of the intake air amount GA from the initiation of the second determination period). Furthermore, the first peak supercharging pressure PF1 is the increased amount of the supercharging pressure P in the first determination period. The second peak supercharging pressure PF2 is the increased amount of the supercharging pressure P in the second determination period. According to the first abnormality determination, it is possible to favorably determine the presence or absence of the slightly opened fixing of the waste gate valve 35, with which the change appeared in the supercharging pressure P is relatively small. However, in this first abnormality determination, it is difficult to determine the presence or absence of the fully opened fixing of the waste gate valve 35. On the other hand, in the second abnormality determination, it is possible to favorably determine the presence or absence of the fully opened fixing of the waste gate valve 35. Thus, in this embodiment, both of the slightly opened fixing and the fully opened fixing of the waste gate valve 35 can favorably be diagnosed. Therefore, according to this embodiment, it is possible to further favorably diagnose the abnormality of the supercharging system, which includes the abnormality with the relatively small change being appeared in the supercharging pressure.

(2) In the case where separate parameters are used to make the first abnormality determination and the second abnormality determination, requisite conditions to secure the determination accuracy differ from each other. Accordingly, it may be difficult to make both of the determinations in a similar manner. In regard to this point, the same parameter is used for both of the determinations in this embodiment. Thus, frequencies of making both of the determinations can easily match each other.

(3) The integrated value of the increased amount of the intake air amount GA, which is more correlated with the peak supercharging pressure than with the integrated value of the intake air amount GA itself is used in the first abnormality determination and the second abnormality determination. Thus, the diagnoses with the further high accuracy are possible.

Next, a detailed description will be made on a second embodiment of the invention about the supercharging system and the diagnostic method for the supercharging system with reference to FIG. 8 and FIG. 9. It should be noted that the similar components as those in the above-described embodiment are denoted by the same reference numerals in this embodiment and a third embodiment, which will be described below, and the detailed description thereof will not be made.

In the first embodiment, the first abnormality determination and the second abnormality determination are made in the separate routines. However, these are made in a common routine in the second embodiment. FIG. 8 and FIG. 9 are a flowcharts of an abnormality determination processing routine that is executed to make both of the first abnormality determination and the second abnormality determination in such a case.

Once this routine is initiated, it is first determined in step S300 whether an abnormality determination completed flag FLAG_D is cleared (OFF). Here, if the abnormality determination completed flag FLAG_D is cleared (YES), the processing proceeds to step S303. If set (ON) (NO), the processing proceeds to step S301.

If the processing proceeds to step S301, it is determined in step S301 whether the preconditions for the determination are established. It should be noted that the preconditions for the determination in this case are also the same as those in the first embodiment. Here, if the preconditions for the determination are established (YES), the processing proceeds to step S302. If not established (NO), the current processing of this routine is terminated as is.

If the processing proceeds to step S302, the abnormality determination completed flag FLAG_D is cleared (OFF) in step S302, and the abnormality determination is thereby initiated. Thereafter, the processing proceeds to step S303.

When the processing proceeds to step S303, it is determined in step S303 whether the fully closing of the waste gate valve 35 is commanded. If the fully closing of the waste gate valve 35 is not commanded (NO), the clear processing is executed in step S370, and thereafter the current processing of this routine is terminated. It should be noted that the following processing is executed in the clear processing at this time. That is, in this clear processing, the values of the first air amount integrated value TGA1 and the second air amount integrated value TGA2 are reset (TGA1=TGA2=0). In addition, each of the abnormality determination completed flag FLAG_D, the first integration completed flag FLAG_S1, and the second integration completed flag FLAG_S2 is set (ON).

On the other hand, if the fully closing of the waste gate valve 35 is commanded (S303: YES), the processing proceeds to step S304. Then, it is determined in step S304 whether the intake air amount GA is currently increased. If the intake air amount GA is currently increased here (YES), the processing proceeds to step S320 in FIG. 9. If not increased (NO), the processing proceeds to step S305 in FIG. 8.

If the processing proceeds to step S305, it is determined in step S305 whether the increase in the intake air amount GA is terminated. If the increase in the intake air amount GA is terminated (YES), the processing proceeds to step S350. If not terminated (NO), the processing proceeds to step S320 in FIG. 9.

Here, if the processing proceeds to step S320 (S304: YES or S305: NO), the integration processing of the first air amount integrated value TGA1 and the second air amount integrated value TGA2 is executed in step S320 to step S326.

First, it is determined in step S320 whether the second integration completed flag FLAG_S2 is set (ON). Here, if the second integration completed flag FLAG_S2 is set (YES), the processing proceeds to step S321. When the processing proceeds to step S321, the current value of the intake air amount GA is set as the second reference air amount GB2 in step S321. Then, after the second integration completed flag FLAG_S2 is cleared (OFF), the processing proceeds to step S322. On the other hand, if the second integration completed flag FLAG_S2 is not set, that is, if the second integration completed flag FLAG_S2 is cleared (OFF) (S320: NO), the processing proceeds to step S322 as is. Then, when the processing proceeds to step S322, the value that is obtained by subtracting the second reference air amount GB2 from the current value of the intake air amount GA is added to the second air amount integrated value TGA2 in step S322.

Next, it is determined in step S323 whether the first integration completed flag FLAG_S1 is set (ON). If the first integration completed flag FLAG_S1 is set (ON) (YES) here, the processing proceeds to step S324. In step S324, it is determined whether the supercharging pressure P is equal to or higher than the supercharging initiation pressure Ps. Here, if the supercharging pressure P still remains lower than the supercharging initiation pressure Ps (NO), the current processing of this routine is terminated as is. If not (YES), the processing proceeds to step S325. Then, the current value of the intake air amount GA is set as the first reference air amount GB1 in step S325. Then, after the first integration completed flag FLAG_S1 is cleared (OFF), the processing proceeds to step S326. On the other hand, if the first integration completed flag FLAG_S1 is not set, that is, if the first integration completed flag FLAG_S1 is cleared (OFF) (S323: NO), the processing proceeds to step S326 as is. Then, when the processing proceeds to step S326, the value that is obtained by subtracting the first reference air amount GB1 from the current value of the intake air amount GA is added to the first air amount integrated value TGA1 in step S326. Thereafter, the current processing of this routine is terminated.

Meanwhile, if the processing proceeds to step S350 (S305: YES), the abnormality determinations in the first abnormality determination and the second abnormality determination are made in step S350 to step S363.

First, in step S350, the current value of the supercharging pressure P is set as peak supercharging pressure PF. Then, it is determined in following step S351 whether the peak supercharging pressure PF is equal to or higher than the specified value α.

Here, if the peak supercharging pressure PF is equal to or higher than the specified value α (YES), the processing proceeds to step S353, and the determination processing for the first abnormality determination is executed. More specifically, the first abnormality determination value β is set based on the first air amount integrated value TGA1 in step S353. In following step S354, it is determined whether the peak supercharging pressure PF is lower than the first abnormality determination value β. Here, if the peak supercharging pressure PF is lower than the first abnormality determination value β (YES), it is determined in step S355 that the slightly opened fixing of the waste gate valve 35 is present. If not (NO), it is determined in step S356 that there is no abnormality. Then, after the clear processing in step S370 is executed, the current processing of this routine is terminated.

On the other hand, if the peak supercharging pressure PF is lower than the specified value α (S351: NO), the processing proceeds to step S360. In step S360, it is determined whether the second air amount integrated value TGA2 is equal to or higher than the specified value γ. Here, if the second air amount integrated value TGA2 is equal to or higher than the specified value γ (YES), the processing proceeds to step S361, and the determination processing for the second abnormality determination is executed. More specifically, the second abnormality determination value ε is set based on the second air amount integrated value TGA2 in step S361. Then, in following step S362, it is determined whether the peak supercharging pressure PF is lower than the second abnormality determination value ε. Here, if the peak supercharging pressure PF is lower than the second abnormality determination value ε (YES), it is determined in step S363 that the fully opened fixing of the waste gate valve 35 is present. If not (NO), it is determined in step S356 that there is no abnormality. Then, after the clear processing in step S370 is executed, the current processing of this routine is terminated.

On the other hand, if the second air amount integrated value TGA2 is lower than the specified value γ (S360: NO), the clear processing in step S370 is executed, and then the current processing of this routine is terminated without making the determination. In other words, the determination is suspended at this time.

The first abnormality determination and the second abnormality determination that are similar to those in the first embodiment are made by execution of the abnormality determination processing routine that has been described so far. Therefore, the same operational effects as those in the first embodiment can be attained by this embodiment.

In the first embodiment, the presence or absence of the abnormality is determined for the first abnormality determination by determining whether the first peak supercharging pressure PF1 is lower than the first abnormality determination value β, which is set based on the first air amount integrated value TGA1. In addition, the presence or absence of the abnormality is determined for the second abnormality determination by determining whether the second peak supercharging pressure PF2 is lower than the second abnormality determination value ε, which is set based on the second air amount integrated value TGA2. In the third embodiment of the invention, which will be described below, these determinations are made by determining whether the air amount integrated value is higher than the abnormality determination value that is set based on the peak supercharging pressure. The same determination results as those in the first embodiment can also be obtained in such a case of the third embodiment.

Figure 10:
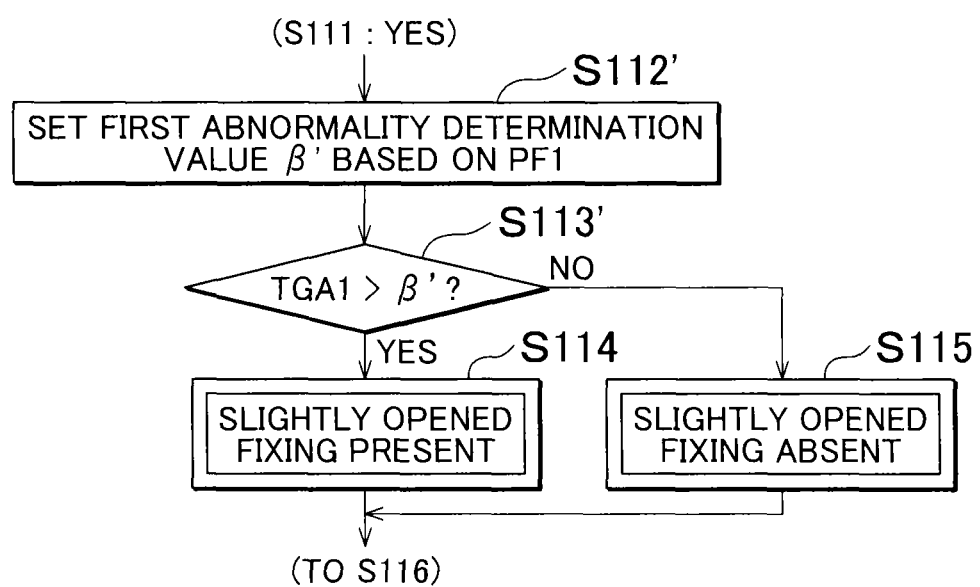
FIG. 10 is a flowchart of a part changed from the first abnormality determination processing routine in FIG. 4 that is executed by a supercharging system and a diagnostic method therefor of a third embodiment as yet another example of the invention.

FIG. 10 that depicts parts of an abnormality determination processing routine of the third embodiment depicts changed parts of the flowchart in the case where the first abnormality determination in the first abnormality determination processing routine in FIG. 4 of the first embodiment is made in such an aspect. In this case, if the positive determination is made for the determination in step S111 in FIG. 4 (YES), the processing proceeds to step S112' in FIG. 10. Then, in this step S112', a first abnormality determination value β' is set based on the first peak supercharging pressure PF1. In the normal time, the first abnormality determination value β' is set as a slightly higher value than an upper limit value in a predicted range of the first air amount integrated value TGA1 that is predicted from the first peak supercharging pressure PF1 at the time. Then, it is determined in following step S113' whether the first air amount integrated value TGA1 exceeds the first abnormality determination value β'. If exceeding (YES), it is determined in step S114 that the slightly opened fixing is present. If not exceeding (NO), it is determined in step S115 that the slightly opened fixing is absent.

Figure 11:
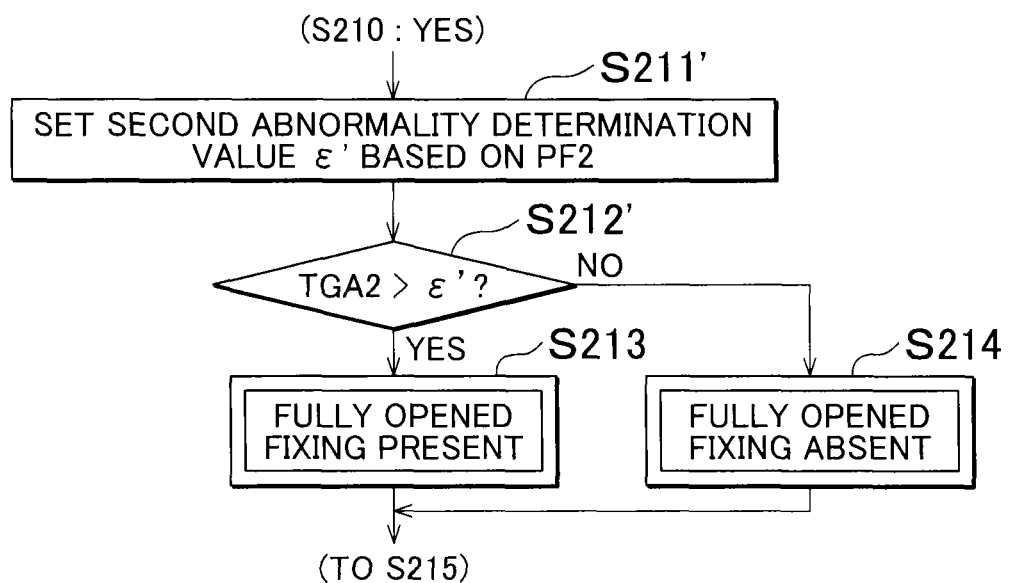
FIG. 11 is a flowchart of a part changed from the second abnormality determination processing routine in FIG. 5 that is executed by the supercharging system and the diagnostic method therefor of the third embodiment.

FIG. 11 depicts changed parts of the flowchart in the case where the second abnormality determination in the second abnormality determination processing routine in FIG. 5 is made in the above aspect. In this case, if the positive determination is made for the determination in step S210 in FIG. 5 (YES), the processing proceeds to step S211' in FIG. 11. Then, in this step S211', a second abnormality determination value ε' is set based on the second peak supercharging pressure PF2. In the normal time, the second abnormality determination value ε' is set at a slightly higher value than an upper limit value in a predicted range of the value of the second air amount integrated value TGA2 that is predicted from the second peak supercharging pressure PF2 at the normal time. Then, it is determined in following step S212' whether the second air amount integrated value TGA2 exceeds the second abnormality determination value ε'. If exceeding (YES), it is determined in step S213 that the fully opened fixing is present. If not exceeding (NO), it is determined in step S214 that the fully opened fixing is absent.

Figure 8:
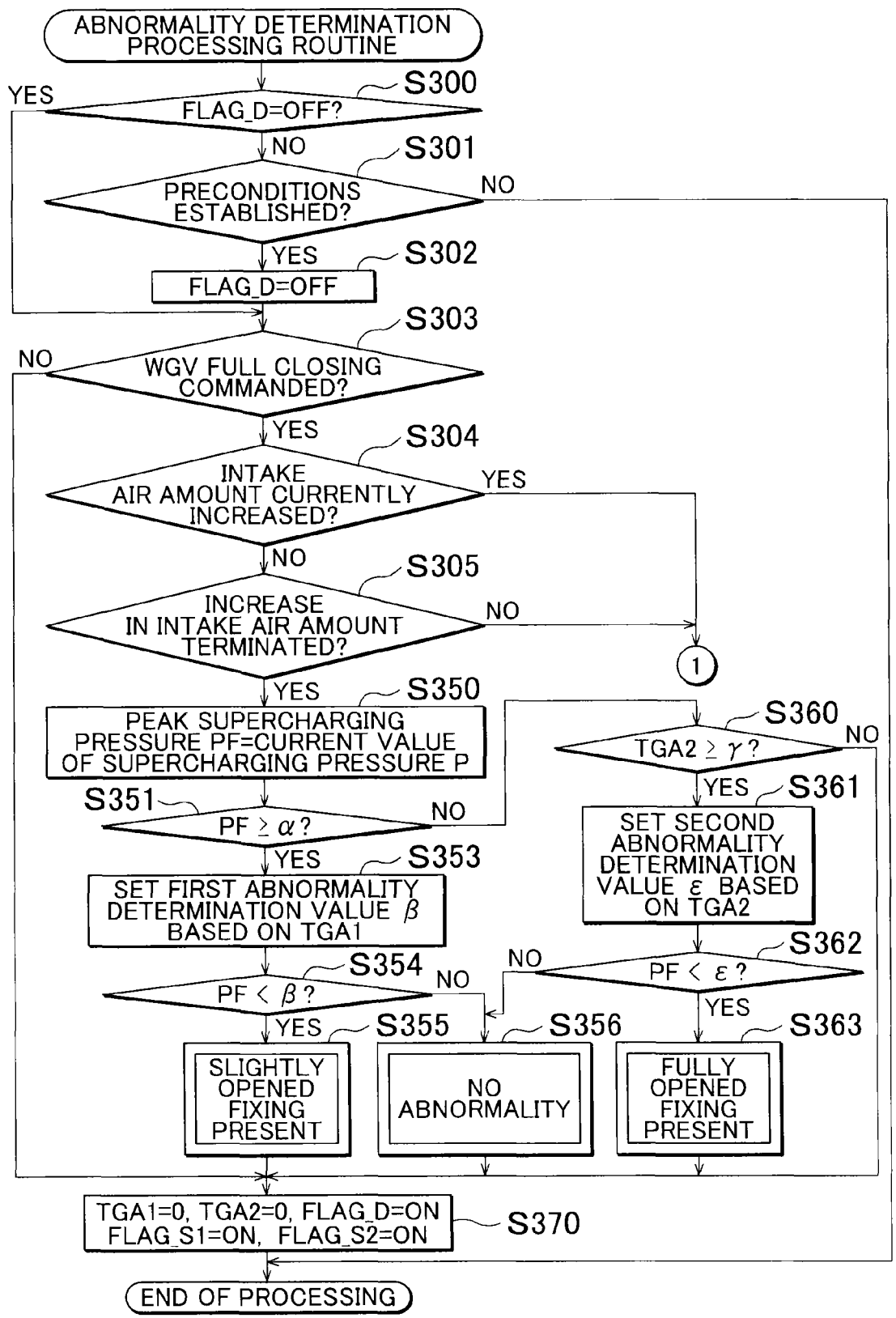
FIG. 8 is a flowchart of a part of processing procedures of an abnormality determination processing routine that is executed by a supercharging system and a diagnostic method therefor of a second embodiment as another example of the invention.
Figure 9:
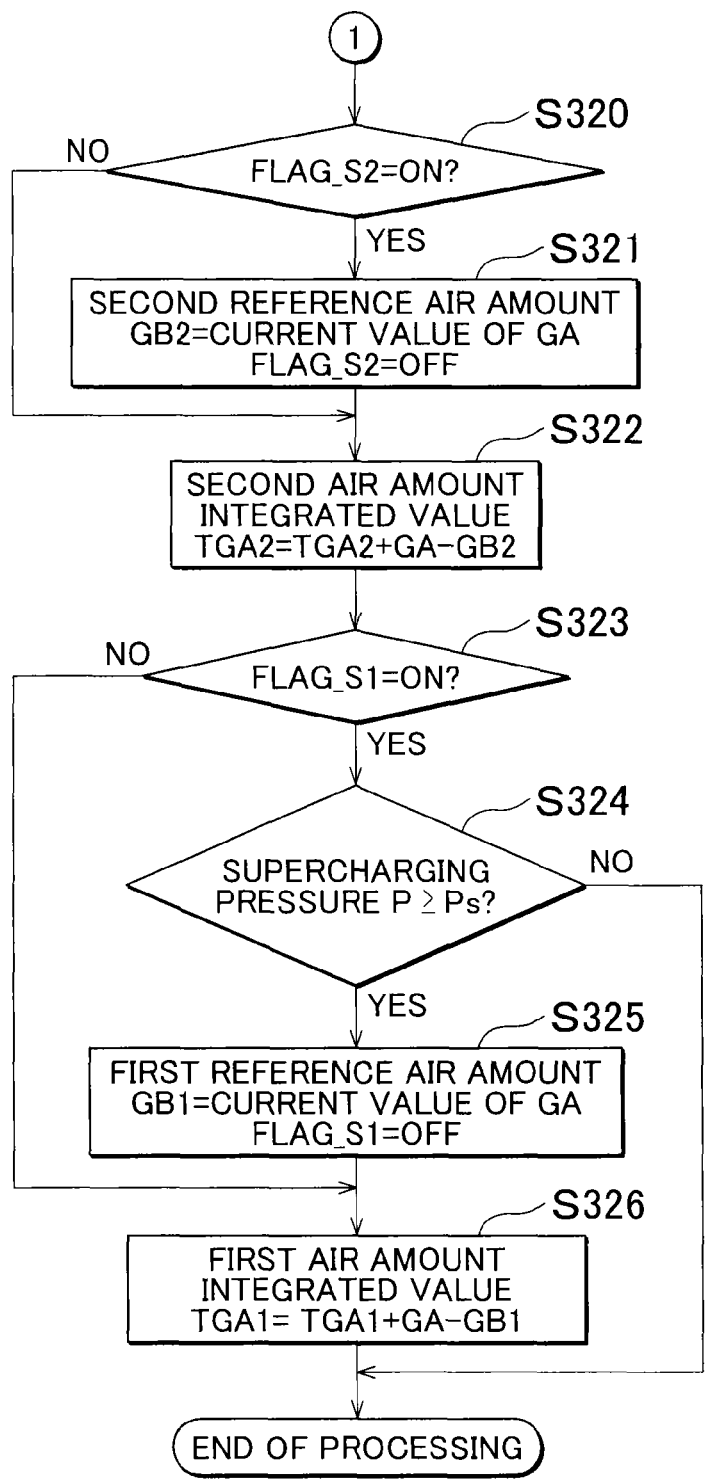
FIG. 9 is a flowchart of rest of the processing procedures of the abnormality determination processing routine in the second embodiment.

It should be noted that the first abnormality determination and the second abnormality determination in the abnormality determination processing routine in FIG. 8 can also be changed and made in the same manner. The diagnostic method of the above embodiment can also be applied to a supercharging system that includes a mechanical supercharger. Thus, a fourth embodiment of the invention will be described below.

Figure 12:
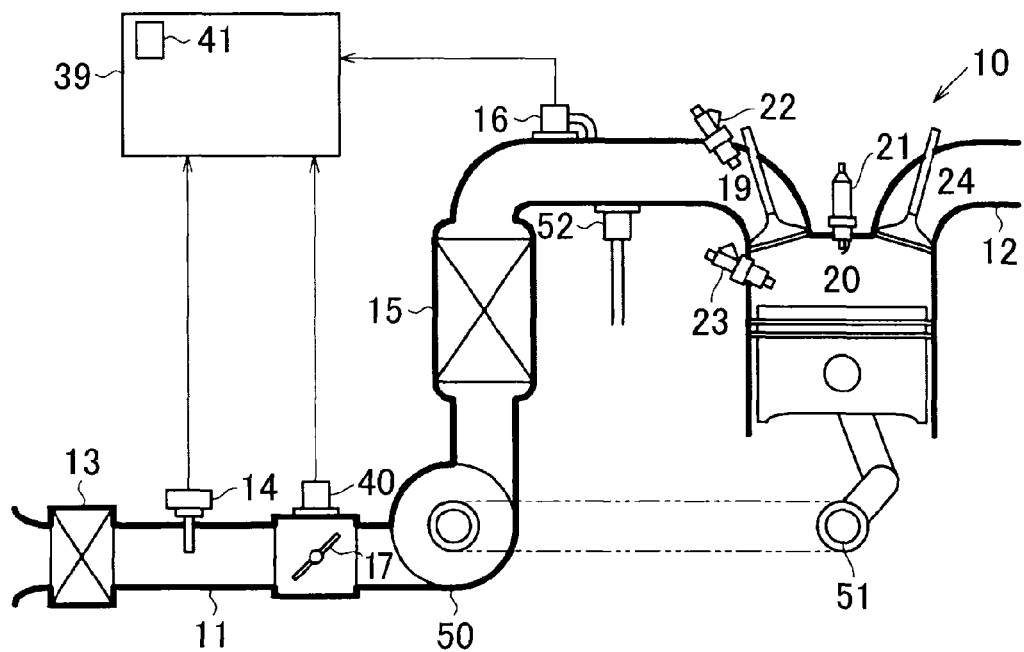
FIG. 12 is a schematic view of a configuration of a supercharging system according to a fourth embodiment as yet another example of the invention.

FIG. 12 depicts an example of a supercharging system that includes a mechanical supercharger. A mechanical supercharging system includes a compressor 50 that is mounted in the intake passage 11 of the internal combustion engine 10. The compressor 50 is configured to be coupled to a crankshaft 51 as an output shaft of the internal combustion engine 10 driven by power of the internal combustion engine 10 for supercharging.

In a portion of the intake passage 11 of the internal combustion engine 10 that is on an upstream side of the compressor 50, the air cleaner 13, the airflow meter 14, and the throttle valve 17 are mounted in an order from an uppermost stream portion thereof toward the downstream side. In addition, the intercooler 15 for cooling the intake air and the supercharging pressure sensor 16 are mounted in a portion of the intake passage 11 that is on a downstream side of the compressor 50.

Furthermore, a relief valve 52 is also mounted in the portion of the intake passage 11 that is on the downstream side of the compressor 50. The relief valve 52 is constructed as a check valve of a constantly closed type, and is opened when intake air pressure in a portion of the intake passage 11 where the valve is mounted exceeds a certain value to discharge some of the intake air to the outside. In this way, the relief valve 52 functions as the supercharging pressure lowering mechanism that lowers the supercharging pressure when the supercharging pressure is excessively high.

There is a case where the slightly opened fixing or the fully opened fixing occurs to the relief valve 52 of such a supercharging system. There is a case where the relief valve 52 is fixed at a position on a slightly opened side from the fully closed position and thus is not fully closed or where the relief valve 52 is fixed in the vicinity of the fully opened position and thus remains to be opened. When the slightly opened fixing occurs to the relief valve 52, a slight amount of the intake air is leaked through the relief valve 52. Thus, the supercharging pressure P is slightly lowered than the proper supercharging pressure P. In addition, the supercharging pressure P is significantly lowered from the proper supercharging pressure P during the fully opened fixing of the relief valve 52.

Similar to the case of the waste gate valve 35, it is possible by using the diagnostic method in the above embodiment to diagnose the slightly opened fixing or the fully opened fixing of such a relief valve 52. In other words, it is possible in the first abnormality determination to determine the presence or absence of the slightly opened fixing of the relief valve 52, and it is possible in the second abnormality determination to determine the presence or absence of the fully opened fixing of the relief valve 52. It should be noted that the first air amount integrated value TGA1 and the second air amount integrated value TGA2 can also be computed in this case based on the intake air amount GA that is detected by the airflow meter 14. However, strictly speaking, the flow amount of the intake air that flows into the compressor 50 is correlated with the first peak supercharging pressure PF1 and the second peak supercharging pressure PF2 in this case.

Each of the above embodiments can be implemented by being changed as follows.

In the above embodiments, the initiation of the first determination period is confirmed at the time that the supercharging pressure P becomes equal to or higher than the supercharging initiation pressure Ps. However, another method may be used for the confirmation. For example, the confirmation can also be made based on a change rate of the supercharging pressure P, a change rate of the intake air amount GA, or an elapsed time from the initiation of the increase in the intake air amount GA.

In the above embodiments, the termination of the first determination period is confirmed based on the increase rate of the supercharging pressure P. However, another method may be used for the confirmation. For example, the confirmation can also be made based on the increase rate of the intake air amount GA or an elapsed time from the initiation of the increase in the supercharging pressure P.

In the above embodiments, the initiation of the second determination period is confirmed by the increase in the intake air amount GA. However, another method may be used for the confirmation. For example, the confirmation can also be made from an increase in the throttle opening degree TA or a depression amount of the accelerator pedal.

In the above embodiments, the termination of the second determination period is confirmed based on the increase rate of the intake air amount GA. However, another method may be used for the confirmation. For example, the confirmation can also be made based on the increase rate of the supercharging pressure P or the elapsed time from the initiation of the increase in the supercharging pressure P.

In the above embodiments, the first air amount integrated value TGA1 is computed as the value that is obtained by integrating the increased amount of the intake air amount GA from the initiation of the first determination period. However, the first air amount integrated value TGA1 may be computed as a value that is obtained by integrating the intake air amount GA itself. Similarly, the second air amount integrated value TGA2 is also computed as the value that is obtained by integrating the increased amount of the intake air amount GA from the initiation of the second determination period. However, the second air amount integrated value TGA2 may be computed as the value that is obtained by integrating the intake air amount GA itself.

In the above embodiments, the supercharging pressure P at the time of the termination of the first determination period is set as the first peak supercharging pressure PF1, and the supercharging pressure P at the time of the termination of the second determination period is set as the second peak supercharging pressure PF2. This is because the supercharging pressure P at the time of the initiation of each of the first abnormality determination and the second abnormality determination seems to be approximately zero and the supercharging pressure P at the time of the termination of each of the first determination period and the second determination period seems to equal the increased amount of the supercharging pressure P up until the current time. In the case where it is desired to compute the first peak supercharging pressure PF1 and the second peak supercharging pressure PF2 further strictly or in the case where the supercharging pressure P at the time of the initiation of each of the first abnormality determination and the second abnormality determination is not zero, the supercharging pressure P at the time of the initiation and the termination of each of the first determination period and the second determination period may be computed, and the first peak supercharging pressure PF1 and the second peak supercharging pressure PF2 are each computed from a difference among these.

In an internal combustion engine in which a fuel vapor purge processing system or an exhaust gas recirculation system is installed, there is a case where the flow amount of the intake air that flows into the combustion chamber 20 is larger than a detected value of the intake air amount GA by the airflow meter 14. In the case of the supercharging system that is provided in such an internal combustion engine, there is a case where the diagnosis accuracy can further be increased by computing the first air amount integrated value TGA1 and the second air amount integrated value TGA2 by using a value that is obtained by adding a flow rate of gas that is merged in the middle to the intake air amount GA.

The flow amount of the intake air that flows into the combustion chamber 20 may be obtained by using a value other than the detected value of the intake air amount GA by the airflow meter 14. For example, the flow amount of the intake air that flows into the combustion chamber 20 can be obtained from computation based on the supercharging pressure P and the engine speed.

In the above embodiment, the supercharging pressure sensor 16 detects differential pressure between the absolute pressure of the intake air in the portion of the intake passage 11 that is on the downstream side of the compressor 30 and the atmospheric pressure as the supercharging pressure P. However, a sensor for detecting the absolute pressure of the intake air in the above portion may be used. Also in this case, if the supercharging pressure P is obtained by subtracting the atmospheric pressure, which is detected separately, from the detected value, the same diagnoses as those in the above embodiments can be made. In addition, such absolute pressure can be used as is as the supercharging pressure P for the diagnoses.

What is claimed is:

1. A supercharging system comprising:
   a supercharger configured to supercharge an internal combustion engine;
   a supercharging pressure lowering mechanism configured to lower supercharging pressure by the supercharger; and
   an electronic control unit configured to:
   (i) execute a first abnormality determination, the first abnormality determination having a period from initiation of an increase in the supercharging pressure that occurs after initiation of an increase in an intake air amount to termination of the increase in the supercharging pressure as a first determination period,
   (ii) determine presence or absence of abnormality of the supercharging system based on a first air amount integrated value of the intake air amount and a first peak supercharging pressure in the first determination period when an increased amount of the supercharging pressure in the first determination period is set as the first peak supercharging pressure,
   (iii) execute a second abnormality determination, the second abnormality determination having a period from initiation of an increase in the intake air amount to termination of an increase in the supercharging pressure as a second determination period, and
   (iv) determine presence or absence of the abnormality of the supercharging system based on a second air amount integrated value of the intake air amount and a second peak supercharging pressure in the second determination period when an increased amount of the supercharging pressure in the second determination period is set as the second peak supercharging pressure.

2. The supercharging system according to claim 1, wherein the electronic control unit is configured to:
   in the first abnormality determination, (i) set a first abnormality determination value to be a higher value when the first peak supercharging pressure is high in comparison with a case where the first peak supercharging pressure is low, and (ii) determine that there is abnormality in the supercharging system when the first air amount integrated value of the intake air amount is higher than the first abnormality determination value,
   in the second abnormality determination, (iii) set a second abnormality determination value to be a higher value when the second peak supercharging pressure is high in comparison with a case where the second peak supercharging pressure is low, and (iv) determine that there is abnormality in the supercharging system when the second air amount integrated value of the intake air amount is higher than the second abnormality determination value.

3. The supercharging system according to claim 1, wherein the electronic control unit is configured to:
   in the first abnormality determination, (i) set a first abnormality determination value to be a higher value when the first air amount integrated value of the intake air amount is high in comparison with a case where the first air amount integrated value is low, and (ii) determine that there is abnormality in the supercharging system when the first peak supercharging pressure is lower than the first abnormality determination value,
   in the second abnormality determination, (iii) set a second abnormality determination value to be a higher value when the second air amount integrated value of the intake air amount is high in comparison with a case where the second air amount integrated value is low, and (iv) determine that there is abnormality in the supercharging system when the second peak supercharging pressure is lower than the second abnormality determination value.

4. The supercharging system according to claim 1, wherein the electronic control unit is configured to:
   (i) compute the first air amount integrated value of the intake air amount as a value that is obtained by integrating an increased amount of the intake air amount from the initiation of the first determination period in the first abnormality determination; and
   (ii) compute the second air amount integrated value of the intake air amount as a value that is obtained by integrating an increased amount of the intake air amount from the initiation of the second determination period in the second abnormality determination.

5. The supercharging system according to claim 1, wherein the supercharger is a supercharger including an exhaust turbine, and the supercharger is configured to supercharge by driving a compressor that is mounted in an intake passage of the internal combustion engine by the exhaust turbine that is mounted in an exhaust passage of the internal combustion engine and operated by a flow force of exhaust gas flowing in the exhaust passage, and the supercharging pressure lowering mechanism is a waste gate valve, the waste gate valve is mounted in a bypass passage through which the exhaust gas flows while bypassing the exhaust turbine, the waste gate valve is configured to block the exhaust gas from flowing through the bypass passage when the waste gate valve is fully closed, and the waste gate valve is configured to permit the exhaust gas to flow through the bypass passage when the waste gate valve is opened.

6. The supercharging system according to claim 1, wherein the supercharger is a mechanical supercharger, and the mechanical supercharger is configured to supercharge by driving a compressor that is mounted in an intake passage of the internal combustion engine by power of the internal combustion engine, and the supercharging pressure lowering mechanism is a relief valve, the relief valve is provided in a portion of the intake passage of the internal combustion engine that is on a downstream side of the compressor, and the relief valve is configured to: (i) discharge some of the intake air flowing through the relief valve to the outside when the relief valve is opened, and (ii) block discharging from the relief valve when the relief valve is fully closed.

7. A diagnostic method for a supercharging system, the supercharging system including a supercharger configured to supercharge an internal combustion engine and a supercharging pressure lowering mechanism configured to lower supercharging pressure, the diagnostic method comprising:
(i) setting a period from initiation of an increase in the supercharging pressure that occurs after initiation of an increase in an intake air amount to termination of the increase as a first determination period;
(ii) setting a period from the increase in the intake air amount to the termination of the increase in the supercharging pressure as a second determination period; and
(iii) executing a first abnormality determination and a second abnormality determination as determinations of presence or absence of abnormality of the supercharging system, the first abnormality determination being a determination that is based on a relationship between a first air amount integrated value of the intake air amount and a first peak supercharging pressure in the first determination period when an increased amount of the supercharging pressure in the first determination period is set as the first peak supercharging pressure, and the second abnormality determination is a determination that is based on a relationship between a second air amount integrated value of the intake air amount and a second peak supercharging pressure in the second determination period when an increased amount of the supercharging pressure in the second determination period is set as the second peak supercharging pressure.

8. The diagnostic method according to claim 7, the diagnostic method further comprising:
(i) determining in the first abnormality determination that there is abnormality in a case where the first air amount integrated value of the intake air amount in the first determination period is deviated on a positive side from a value during a normal time that is assumed from the first peak supercharging pressure; and
(ii) determining in the second abnormality determination that there is abnormality in a case where the second air amount integrated value of the intake air amount in the second determination period is deviated on a positive side from a value during a normal time that is assumed from the second peak supercharging pressure.

9. The diagnostic method according to claim 7, the diagnostic method further comprising:
(i) determining in the first abnormality determination that there is abnormality in a case where the first peak supercharging pressure is deviated on a negative side from a value during a normal time that is assumed from the first air amount integrated value of the intake air amount in the first determination period; and
(ii) determining in the second abnormality determination that there is abnormality in a case where the second peak supercharging pressure is deviated on a negative side from a value during a normal time that is assumed from the second air amount integrated value of the intake air amount in the second determination period.

10. The diagnostic method according to claim 7, wherein the first air amount integrated value of the intake air amount that is used in the first abnormality determination is obtained by integrating an increased amount of the intake air amount from initiation of the first determination period, and the second air amount integrated value of the intake air amount that is used in the second abnormality determination is obtained by integrating the increased amount of the intake air amount from initiation of the second determination period.

* * * * *